US009169109B2

(12) United States Patent
Iwata

(10) Patent No.: US 9,169,109 B2
(45) Date of Patent: Oct. 27, 2015

(54) STACKER CRANE

(75) Inventor: Masashige Iwata, Shiga (JP)

(73) Assignee: Daifuku Co., Ltd. (JP)

( * ) Notice: Subject to any disclaimer, the term of this patent is extended or adjusted under 35 U.S.C. 154(b) by 592 days.

(21) Appl. No.: 13/336,900

(22) Filed: Dec. 23, 2011

(65) Prior Publication Data

US 2012/0168256 A1 Jul. 5, 2012

(30) Foreign Application Priority Data

Dec. 24, 2010 (JP) ................................ 2010-288592

(51) Int. Cl.

*B65G 1/06* (2006.01)
*B66B 9/16* (2006.01)
*B66F 9/07* (2006.01)

(52) U.S. Cl.

CPC ...................................... *B66F 9/07* (2013.01)

(58) Field of Classification Search

CPC ................................ B66F 9/07; B65G 1/0407
USPC ........................................................ 187/244
See application file for complete search history.

(56) References Cited

U.S. PATENT DOCUMENTS

| | | | | |
|---|---|---|---|---|
| 5,564,528 | A * | 10/1996 | Goto et al. | 187/261 |
| 2004/0228709 | A1 | 11/2004 | Ueda | |
| 2005/0211650 | A1* | 9/2005 | Chung | 211/134 |
| 2006/0291992 | A1* | 12/2006 | Tsujimoto | 414/807 |
| 2010/0032247 | A1* | 2/2010 | Amada | 187/401 |
| 2010/0104405 | A1* | 4/2010 | Amada | 414/281 |
| 2011/0014017 | A1* | 1/2011 | Webster | 414/267 |
| 2012/0168255 | A1* | 7/2012 | Iwata | 187/244 |

FOREIGN PATENT DOCUMENTS

| | | |
|---|---|---|
| JP | 07251904 | 3/1995 |
| JP | H02-43898 | 3/1997 |
| JP | 2003-212308 | 7/2003 |
| JP | 2006036454 | 9/2006 |
| JP | 2012193003 A * | 10/2012 |

OTHER PUBLICATIONS

European Search of European App. No. 11195426.9.

* cited by examiner

*Primary Examiner* — William E Dondero
*Assistant Examiner* — Diem Tran
(74) *Attorney, Agent, or Firm* — Mayback & Hoffman, P.A.; Gregory L. Mayback; Rebecca A. Tie

(57) ABSTRACT

A stacker crane has an upper frame, which connects upper portions of front and rear support rods standing from both front and rear end portions of a lower frame, respectively, is connected to the front and rear support rods by bolts. The upper frame includes a main part comprising a first plate following along a vertical direction and having front and rear extensions being extended in the front and rear directions of the crane and mast connecting portions being extended downward from both the front and rear ends of the front and rear extensions. The upper frame has a reinforcing part comprising a second plate following along a horizontal direction projecting from the main part in a width direction and being extended in the front and rear directions. The mast connecting portions of the main part are urged against the side surfaces of the front and rear support rods, respectively.

5 Claims, 20 Drawing Sheets

STACKER CRANE

CROSS-REFERENCE TO RELATED APPLICATIONS

This application claims the priority, under 35 U.S.C. §§119 and 371, of Japanese patent application No. 2010-288592, filed Dec. 24, 2010; the prior application is herewith incorporated by reference in its entirety.

STATEMENT REGARDING FEDERALLY SPONSORED RESEARCH OR DEVELOPMENT

Not Applicable

FIELD OF THE INVENTION

The present invention relates to a stacker crane. In particular, a stacker crane including a lower frame having running wheels runnable along rails at both front and rear end portions of the frame, front and rear support rods standing from the front and rear end portions of the lower frame, an upper frame for connecting the top ends of the front and rear support rods to each other, and a platform being guided by the front and rear support rods.

Such a stacker crane is generally used to store articles in storage racks having storages lengthwise and breadthwise for storing articles. That is to say, the stacker crane travels along the front of the storage racks and the platform moves up and down. Thereby, an article transfer apparatus provided on the platform is moved to positions for transferring articles to the storage of the storage racks, an article loading portion and an article unloading portion for loading articles to be transferred at an article loading portion and for unloading articles stored in the storage at the article unloading portion.

BACKGROUND OF THE INVENTION

A conventional stacker crane is disclosed in Japanese Patent Preliminarily Publication No. 2003-212308, where an upper frame comprises a pair of left and right frame portions. These frame portions are constituted of a pair of front and rear connecting plates, which are connected to the front and rear support rods, respectively, by bolts, and an elongated upper frame portion extended in the front and rear direction of the crane and being connected to the pair of front and rear connecting plates at both ends thereof. The pair of left and right frame portions are connected to the front and rear support rods, respectively, such that the rods are positioned between the left and right frame portions.

Each connecting plate is protruded in an upward direction more than the rods, and the protruded portion of the connecting plate has an engagement portion having a reversed C-shape viewed from the front and rear direction of the crane. The upper frame portion comprises a frame member having a reversed C-shaped cross section and is connected to the connecting plates by bolts in a condition in which the end portions of the upper frame portion in the front and rear direction of the crane are engaged to the engagement portions of the connecting plates, respectively. That is to say, an engagement portion is formed with the connecting plate, to which the upper frame portion is connected by bolts in a condition that the upper frame portion is engaged into the engagement portion of the connecting plate, so that the up-and-down fluctuation of the upper frame portion against the connecting plate can be suitably controlled. Thereby, the pair of front and rear support rods are appropriately connected to the upper and lower frames in a condition that the lower frame, the front and rear support rods, and the upper frame are assembled together forming a frame body having a rectangular shape viewed from side. As such, for instance, a deformation from the rectangular-shaped assembling condition caused by the fluctuation of the parallel-arranged front and rear support rods in the back and forth direction against the lower frame is suitably prevented.

According to the conventional stacker crane disclosed in Japanese Patent Preliminarily Publication No. 2003-212308, the upper frames of the left and right frame portions are connected to each other via the connecting plate, to which the upper frame portions are fit at many points in the back and forth direction of the crane, by bolts, so that the upper frame is constituted as a ladder-shaped frame, which is hard to be deformed as a whole. In the conventional stacker crane disclosed in Japanese Patent Preliminarily Publication No. 2003-212308, a pair of front and rear attachment plates for supporting front and rear guide rollers, respectively (which are being urged against the side surface of a guide rail provided on the ceiling side), are connected to the connecting plate by bolts in a condition that the attachment plates are mounted on the left and right connecting plates, between which the front support rod is held, or mounted on the left and right connecting plates, between which the rear support rod is held.

The upper frame of the conventional stacker crane is constructed so that an engagement portion, which engages the upper frame portion, is formed in the pair of front and rear connecting plates, which are connected to the front and rear support rods by bolts, respectively, and the connecting plate and the upper frame portion are connected to each other by bolts in a condition that the upper frame portion is being engaged into the engagement portion. This, therefore, shows the tendency for the steps for the upper frame production to become complex due to the facts that the shape of the connecting plates is complex. An improvement to this has been long awaited.

Furthermore, the conventional stacker crane is constituted such that the relative movement of the connecting plate and the upper frame portion in the front and rear direction of the crane is restricted due to friction caused by the bolt connection therebetween and, therefore, the connecting strength between the connecting plate and the upper frame in the front and rear direction of the crane is insufficient. As a result, the connecting strength for connecting the front and rear support rods in the front and rear direction of the crane, such as the strength for restricting the movement of the front and rear support rods to the direction that the rods are spaced from each other, becomes insufficient. An improvement from this point of view has also been awaited.

In fact, the production of the upper frame of the conventional stacker crane tends to be cumbersome, and the strength for connecting the front and rear support rods in the front and rear direction of the crane is apt to be insufficient, so that an improvement is awaited.

Incidentally, the upper frame of the conventional stacker crane is constituted such that the pair of front and rear attachment plate for supporting the front and rear guide rollers, which are being urged to the side surface of the guide rail on the ceiling side, are connected to the left and right connecting plates, between which the front support rod is held, or to the left and right connecting plates, between which the rear support rod is held. Thus, a force acting on the guide rollers is caused when the guide rollers are guided by the guide rail; it acts on the connecting plates being connected to the support rods. Therefore, it is necessary to make the strength of the connecting plate and the strength for attaching the connecting plates to the support rods sufficiently high.

SUMMARY OF THE INVENTION

The present invention has been carried out with the view to the above revelations to provide a stacker crane in which the front and rear support rods can be appropriately connected to the upper frame, while making the manufacturing of the upper frame easy.

The stacker crane according to the present invention comprises a lower frame having running wheels runnable along rails at both front and rear end portions of the frame, front and rear support rods standing from the front and rear end portions of the lower frame, an upper frame for connecting the top ends of the front and rear support rods to each other, and a platform being guided by the front and rear support rods so as to be freely lifted up and down. The first characteristic structure of the stacker crane is as follows:

the upper frame comprises a main part comprised of a first plate elongated in a vertical direction, and a reinforcing part comprised of a second plate elongated in a horizontal direction, wherein the main part comprises front and rear extensions extended in the front and rear direction of the crane and mast connecting portions downwardly extended from both front and rear ends of the front and rear extensions, respectively, and wherein the second plate of the reinforcing part projects from the main part in a width direction of the crane and extends in the front and rear direction of the crane; and the mast connecting portions of the main part are connected to front and rear support rods by bolts while being urged against the side surfaces of the front and rear support rods, respectively.

That is to say, the main part constituting the upper frame of the crane comprises a first plate elongated in a vertical direction comprising front and rear extensions and mast connecting portions; and the main part is formed as an integrated first plate elongated in a vertical direction. From such a configuration, it is possible to give sufficient tension strength to the upper frame so as to prevent the movement of the front and rear support rods in a direction of separating them from each other.

Furthermore, since the upper frame is provided with a reinforcing part, which is constituted of a second plate elongated in a horizontal direction in a condition such that it projects from the main part in a width direction of the crane and extends in the front and rear direction of the crane, a bending of the main part in the width direction of the crane is restricted by the reinforcing part although the main part is constituted of the (first) plate elongated in a vertical direction. Therefore, the strength for restricting the movement of the front and rear support rods in a direction of closing them to each other can also be given to the upper frame appropriately.

Moreover, because the main part is integrally constituted as a (first) plate elongated in a vertical direction such that it comprises mast connecting portions extended downward from both ends of the front and rear extensions in front and rear direction of the crane, the strength of the main part is sufficiently great to prevent the bending of the front and rear extensions against the mast connecting portion in a vertical direction. Therefore, the pair of front and rear support rods can be appropriately connected to the upper frame in a condition that the lower frame, front and rear support rods, and the upper frame are assembled together so as to form a rectangular shaped frame, for instance, suitably preventing the deformation of the rectangular-shaped assembled position by parallel fluctuation of the front and rear support rods against the lower frame in the front and rear direction. From this, it is possible to provide sufficient strength to connect the front and rear support rods to the upper frame.

In addition, because the main part is integrally formed as a first plate elongated in a vertical direction, it can be manufactured easily. The reinforcing part can also be easily formed to the main part by, for instance, welding a separately manufactured reinforcing part to the main part or bending the upper end portions of the first plate elongated in a vertical direction of the main part to a horizontal direction to use them as the reinforcing part. As such, the manufacturing of the upper frame can be manufactured easily.

In short, according to the first characteristic structure of the present invention, a stacker crane can be provided in which the front and rear support rod can be suitably connected to the upper frame, while making the manufacturing of the upper frame easy.

The second characteristic structure of the present invention, in addition to the first characteristic structure, is as follows:

the upper frame comprises a pair of left and right frame portions comprised of the main part and the reinforcing part; and the pair of left and right frame portions are connected to the front and rear support rods so as to position the rods between the frame portions.

That is to say, the upper frame comprises a pair of left and right frame portions, each of which is composed of the main part and reinforcing part, and these frame portions are connected to the front and rear support rods to position the front and rear support rods therebetween. Then, the front and rear support rods are connected to the pair of left and right frame portions, respectively, whereby the connection strength of the front and rear support rods to the upper frame can be made sufficiently high.

It is noted that, when connecting the front and rear support rods to the pair of left and right frame portions, the upper frame may be formed as a ladder-shaped frame by providing a plurality of connecting frames for connecting the left and right frame portions in a condition where both ends of the connecting frames are connected to the left and right frame portions by bolts, respectively. However, because the main part is strengthened by the reinforcing parts, such a ladder-shaped connecting frame does not have to necessarily be provided.

In short, according to the second characteristic structure, in addition to the function and effect of the first characteristic structure, a stacker crane can be provided where the strength for connecting the front and rear support rods to the upper frame can be made sufficiently high.

The third characteristic structure of the stacker crane according to the present invention, in addition to the above-mentioned second characteristic structure, is as follows:

the reinforcing parts of the pair of left and right frame portions project from the main parts in a width direction of the crane while being extended toward the other side frame portion, so that they are urged against the upper end of the front and rear support rods.

That is to say, when connecting the pair of left and right frame portions to the front and rear support rods, respectively, the position in a vertical direction of the left and right frame portions with respect to the front and rear support rods can be restricted by urging the reinforcing parts against the upper ends of the front and rear support rods. Therefore, the left and right frame portions can be connected to the front and rear support rods in a condition that the vertical position of the left and right frame portions against the front and rear support rods has been determined to be an appropriate position.

In short, according to the third characteristic structure of the present invention, in addition to the function and effect according to the second characteristic structure, a stacker crane can be provided where the left and right frame portions can be connected to the front and rear support rods in a condition that the vertical position of the left and right frame portions against the front and rear support rods can be properly maintained.

The forth characteristic structure of the stacker crane according to the present invention, in addition to the third characteristic structure, is as follows:

the reinforcing part comprises a downward bent portion extending downwardly from the end portions of the portion projecting in a width direction of the crane;

both end portions of the downward bent portions in a front and rear direction of the crane are formed so that they are positioned more inside than the end portions of the projected portion in the front and rear direction viewed from the front and rear direction of the crane; and edge portions of the downward bent portion in the front and rear direction of the crane are urged against the outer circumference of the front and rear support rods in order to restrict the position of the pair of left and right frame portions in the back and forth direction of the crane with respect to the front and rear support rods.

That is to say, the edge portions at the downward bent portions in the front and rear direction of the body are urged against the outer circumferential surface of the front and rear support rods when connecting the pair of left and right frame portions to the front and rear support rods, the position of the left and right frame portions to the front and rear support rods in the front and rear direction of the crane can be limited.

Therefore, the left and right frame portions can be properly connected to the front and rear support rods, while keeping the position of the left and right frame portions in the front and rear direction of the crane to the front and rear support rods in a suitable manner.

In short, according to the fourth characteristic structure of the present invention, in addition to the function and effect of the third characteristic structure, a stacker crane can be provided where the left and right frame portions can be properly connected to the front and rear support rods, while keeping the position of the frame portions with respect to the front and rear support rods in the front and rear direction of the crane in a appropriated manner.

The fifth characteristic structure of the stacker crane according to the present invention, in addition to the first to fourth characteristic structures mentioned above, is as follows:

the lower frame is comprised of front and rear wheel support frames for supporting running wheels and a connecting frame for connecting the front and rear wheel support frames;

a first mount is formed at the lower end portion of the front wheel support frame from amongst the front and rear wheel support frames for holding and mounting the lower end surface of the front support rod from amongst the front and rear support rods; and a second mount is formed at the lower end portion of the rear wheel support frame from amongst the front and rear wheel support frames for holding and mounting the lower end surface of the rear support rod from amongst the front and rear support rods;

the side surface of the front support rod is connected to and supported by the front wheel support frame, while the lower edge surface thereof is held by the first mount of the front wheel support frame; and the side surface of the rear support rod is connected to and supported by the rear wheel support frame, while the lower edge surface thereof is held by the second mount of the rear wheel support frame.

That is to say, because the front support rod is mounted on the first mount of the front wheel support frame, the weight of the front support rod acts on the front wheel support frame; in the same manner, because the rear support rod is mounted on the second mount of the rear wheel support frame, the weight of the rear support rod acts on the rear wheel support frame.

Because the weight of the front support rod acts on the front wheel support frame and the weight of the rear support rod on the rear wheel support frame in this manner, it is harder for the front support rod or the rear support rod to be less inclined in the front or rear direction and, thus, it is possible to make the weight of the front frame light by reducing the strength of the upper frame.

That is to say, if the front support rod or the rear support rod is held and supported by the connecting frame for connecting the front wheel support frame and the rear wheel support frame, the connecting frame would be bent in a downward concave at its middle portion by the weight of the front or rear support rod, and, then, the front or rear support rod would be liable to be inclined so as to be close to each other at the upper portion thereof. Therefore, it would be necessary to give a certain level of strength to the upper frame in order to prevent such inclination.

In contrast, when the weight of the front support rod acts on the front wheel support frame and the weight of the rear support rod acts on the rear wheel support frame, the front support rod and the rear support rod are less inclined in a manner in which the upper portion of the rods become close to each other. Thus, it is possible to trim the weight of the upper frame by decreasing the strength to be given to the upper frame.

In short, according to the fifth characteristic structure of the present invention, in addition to the first to fourth characteristic structures mentioned above, it is possible to provide a stacker crane where the weight of the upper frame can be trimmed and the construction thereof can be made simple by reducing the strength to be given to the upper frame.

The sixth characteristic structure of the present invention, in addition to the first to fifth characteristic structures mentioned above, is that front and rear guide rollers, which are urged against the side surface of guide rail on the ceiling side, are provided on the front and rear support rods.

That is to say, the force generated on the guide rollers does not act on the upper frame but on the front and rear support rods by the fact that the guide rollers are guided by the guide rail on the ceiling side. In this way, the strength to be given to the upper frame can be reduced further and, then, the weight of the upper frame can be further trimmed.

In other words, in a case in which the guide rollers are provided on the upper frame, it is necessary to increase the strength of the upper frame because the force generated on the guide rollers also acts on the upper frame. However, according to the invention, as the guide rollers are provided on the front and rear support rods, the strength to be given to the upper frame can be reduced more.

In short, according to the sixth characteristic structure of the present invention, in addition to the function and effect of the first to fifth characteristic structure, a stacker crane can be provided where the upper frame is further lightened.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

Figure 1:
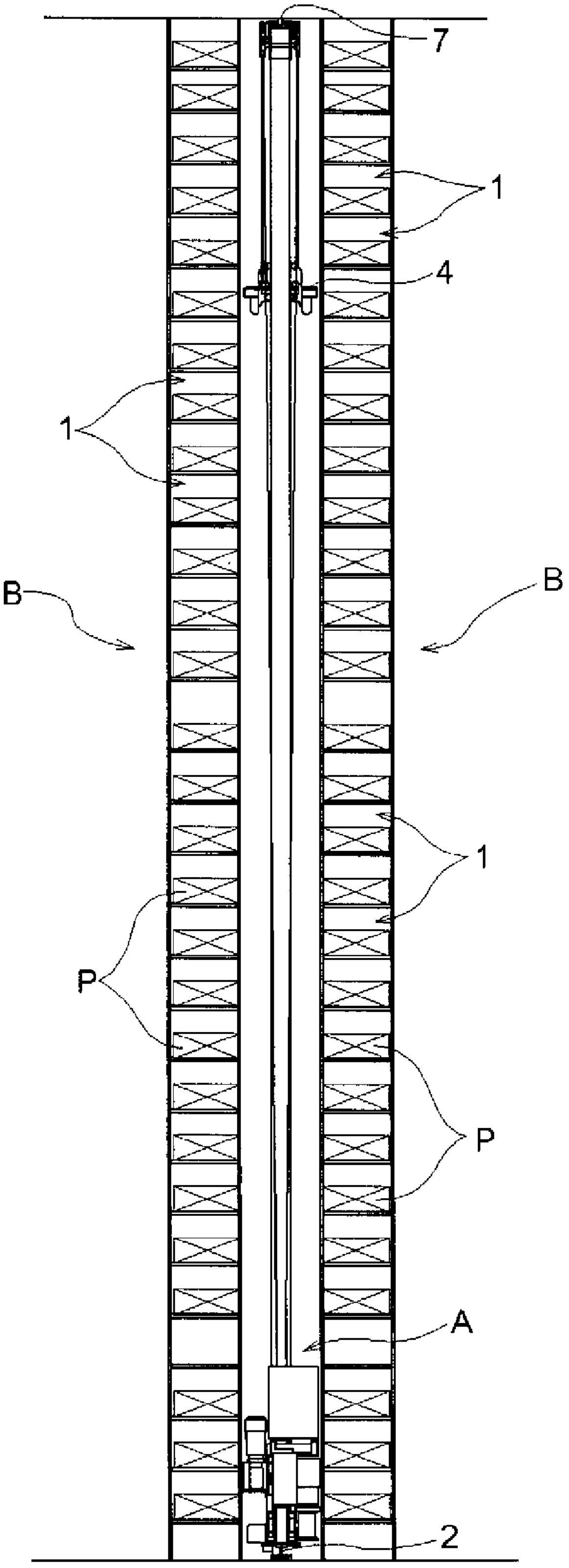
FIG. 1 is a front elevational view of an automated storage according to the invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 2:
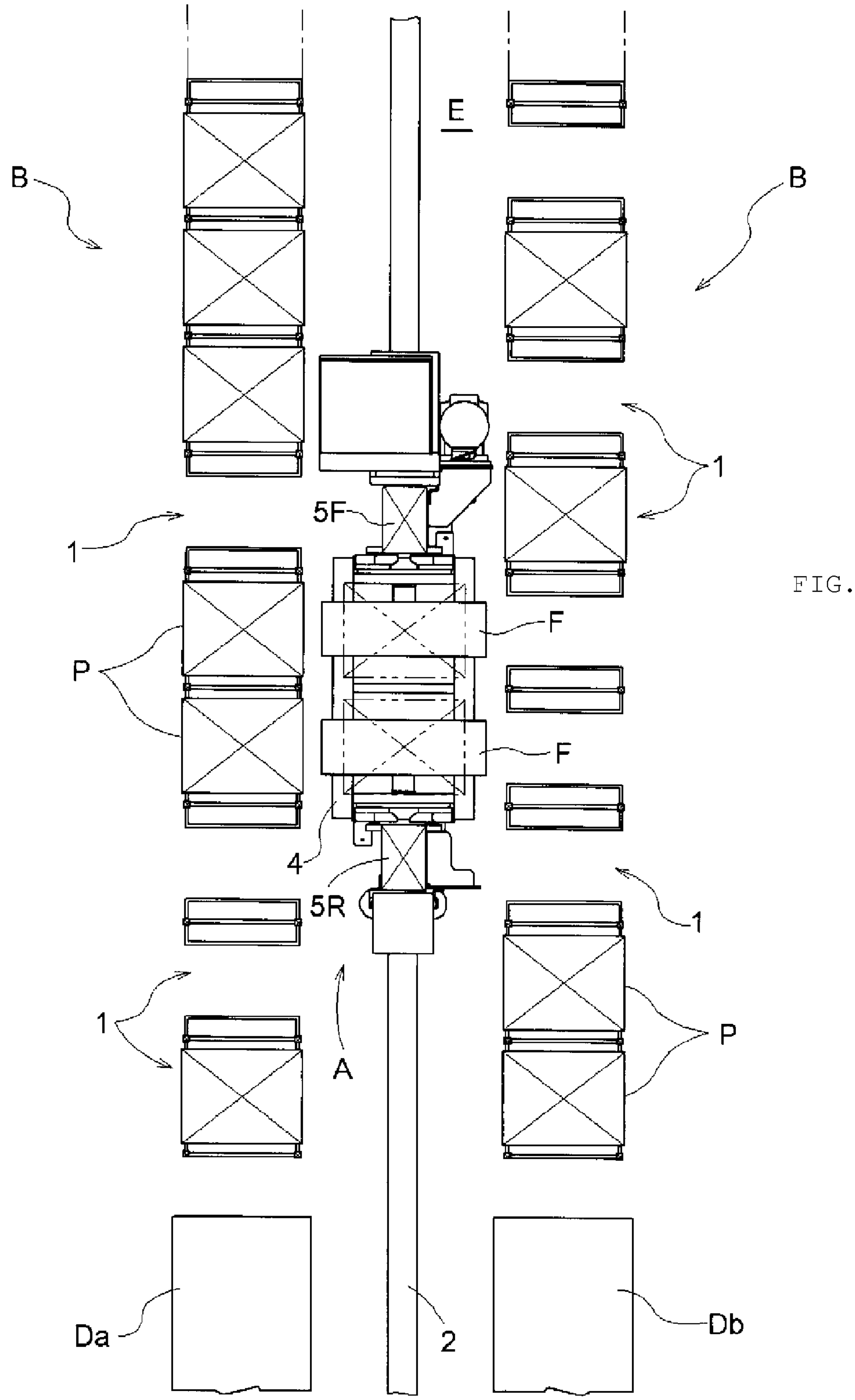
FIG. 2 is a fragmentary, schematic top plan view of the automated storage according to the invention.

Described now are exemplary embodiments of the present invention. Referring now to the figures of the drawings in detail and first, particularly to FIGS. 1 and 2, there are shown front and top views of an automated storage to which the stacker crane according to the present invention is applied. As shown in FIGS. 1 and 2, the automated storage comprises a pair of article storage racks B, which include a plurality of storage spaces 1 for storing articles P, such as bucket-like containers, side by side; a stacker crane A, which travels through working passage E between the pair of storage racks B; an article loading part Da for bringing in articles P to be stored in the storage racks B from the outside and an article unloading part Db for taking out articles P stored in the storage racks B to the outside, which are set at both sides of the pair of storage racks B, respectively. The stacker crane A operates to pick up articles P stored in the storage spaces 1 and bring them to the article unloading part Db and to take out articles P, which have been loaded to the article loading part Da and store them into the storage spaces 1.

The article loading part Da and the article unloading part Db can be conveyors for mounting and transferring articles P. No example is shown there, but at the article transferring place between the article loading and unloading parts Da and Db and the stacker crane A, an article lift for elevating articles, which is configured such that a space is formed for inserting a fork device F is provided, which will be explained later, for transferring articles under articles P.

Figure 3:
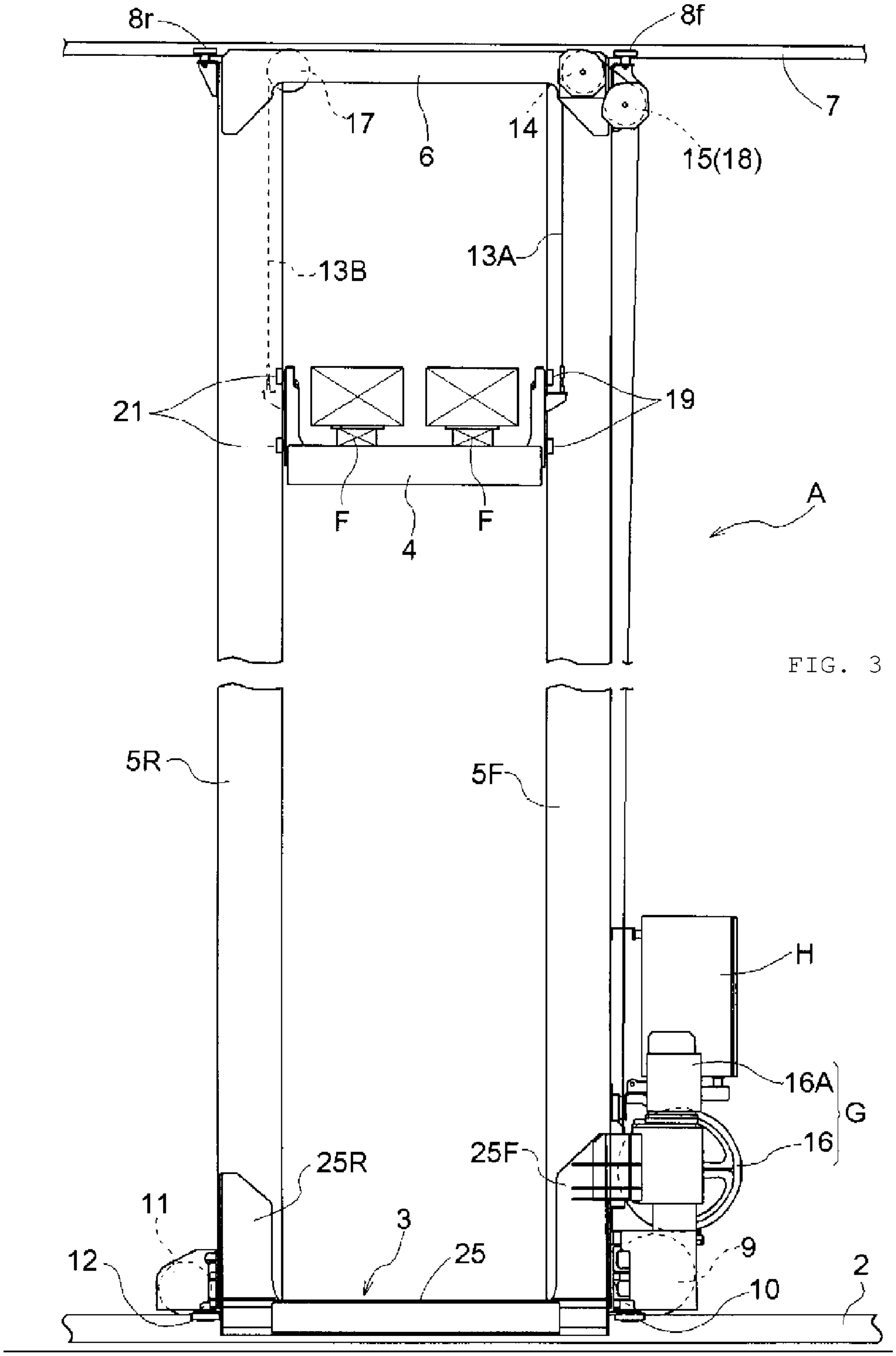
FIG. 3 is a fragmentary, side elevational view of a stacker crane according to the invention.
Figure 4:
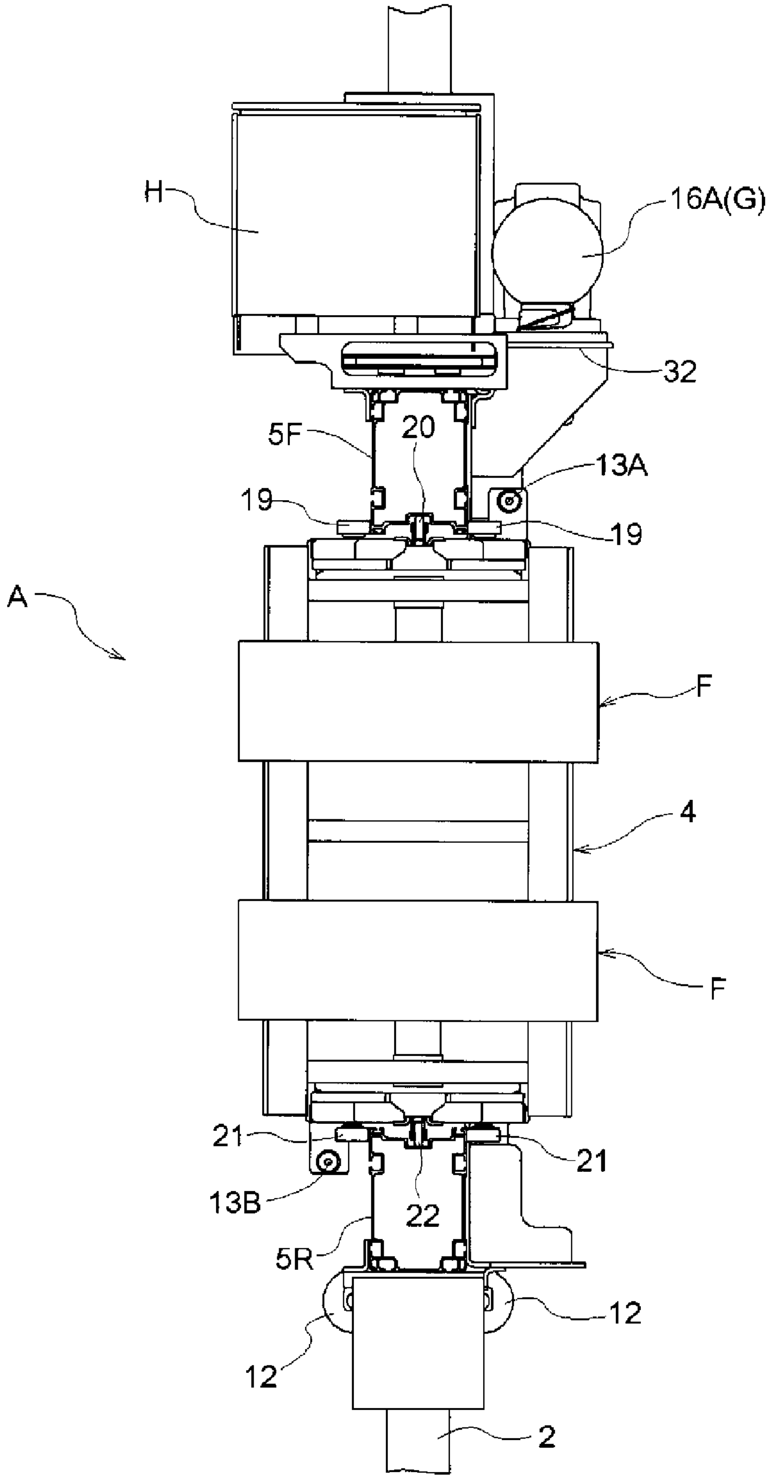
FIG. 4 is a cross-sectional view of the stacker crane of FIG. 3.
Figure 5:
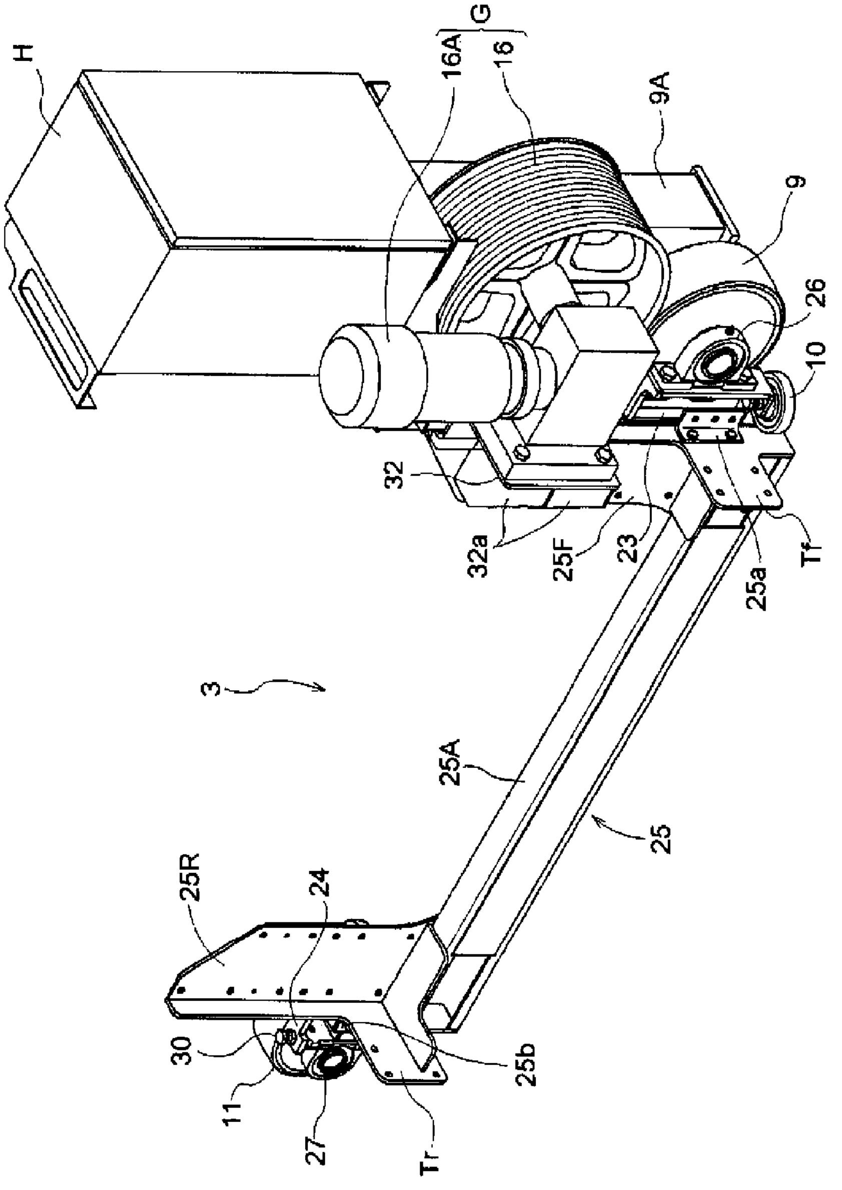
FIG. 5 is a perspective view of the lower frame of the stacker crane of FIG. 3.

As shown in FIGS. 3 and 4, the stacker crane A comprises a lower frame 3, which travels along a single travelling rail 2 provided on the floor along the working passage E; a pair of front and rear support rods 5F and 5R, which stand from the front and rear ends of the lower frame 3 in the traveling direction thereof to guide a platform 4 being movable up and down; and an upper frame 6 for connecting the upper ends of the support rods 5F and 5R to each other. In the automated storage, a guide rail 7 is also provided beneath the ceiling side of the working passage E. On the top ends of the pair of front and rear support rods 5F and 5R are provided, a pair of left and right guide rollers 8*f* and 8*r*, respectively (see FIG. 13), being urged against the side surfaces of the guide rail 7, respectively.

Therefore, the stacker crane A travels through the working passage E, while being guided by the travelling rail 2 and the guide rail 7 so as to carry out the loading and/or unloading operation of articles P mentioned above.

As also mentioned in FIGS. 5 to 8, the lower frame 3 comprises: a driving wheel 9 as a running wheel mounted on an upper surface of the travelling rail 2, and a pair of left and right guiding wheels 10 being urged against the side surface of the travelling rail 2 on one of the sides of the frame in the back and front direction; while on the other sides of the lower frame 3 in the back and front direction, an idling wheel 11 as a running wheel is mounted on the upper surface of the travelling rail 2, and a pair of left and right guiding wheels 12, which are also urged against the side surface of the travelling rail 2 are provided; so that the lower frame 3 travels along the travelling rail 2.

It is noted that the explanation that will be made is with an assumption that the side on which the driving wheel 9 is positioned is the front side of the stacker crane A and the side on which the idling wheel 11 is positioned is the back side of the stacker crane A.

Thus, concerning the pair of front and rear support rods 5F and 5R, the front support rod 5F is on the driving wheel 9 side and the rear support rod 5R is on the idling wheel 11 side.

It is also noted that the front and rear direction of the stacker crane A will be described as a body front and rear direction and the width direction of the stacker crane A as a body width direction.

Figure 16:
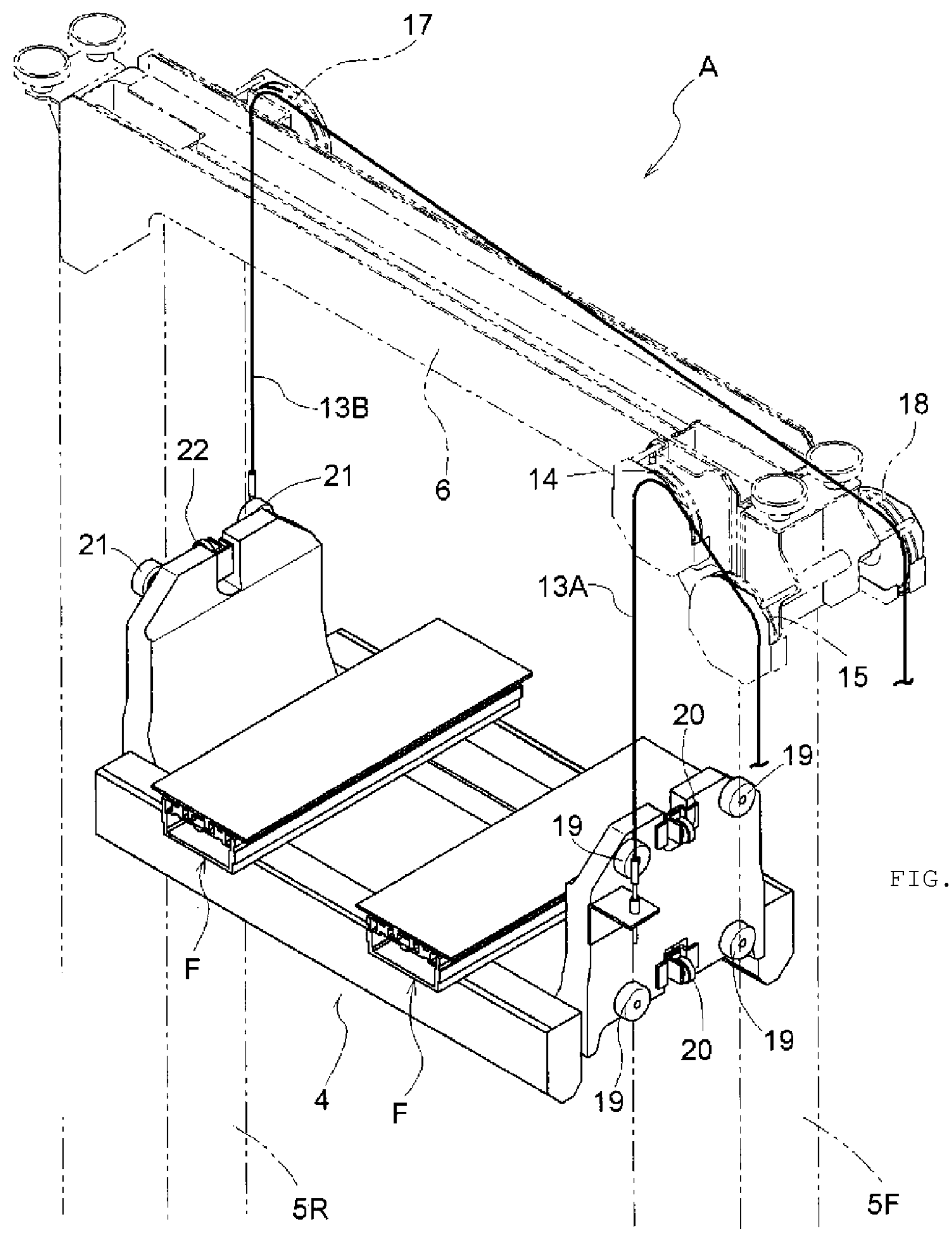
FIG. 16 is a partially hidden, perspective view showing a guided structure of the platform according to the invention.

As represented in FIGS. 3, 4 and 16, the platform 4 is suspended and supported by lifting wires 13A and 13B, which are connected to both the front and rear end portions of the platform 4 as lifting codes, two fork devices F are provided on the platform 4 side to side in the front and rear direction of the body.

The distance between the two fork devices F is the same as that between the storage spaces 1 in the article storage rack B, which are provided in a stack width direction, i.e. the front and rear direction of the body, as represented in FIG. 2, so that the two fork devices F can work the delivery of articles for two storage spaces 1 arranged in the stack width direction at the same time.

As represented in FIGS. 3 and 16, out of the pair of lifting wires 13A and 13B for suspending and supporting the platform 4, the lifting wire 13A connected to the front side of the platform 4 is extended in an upward direction from the platform 4 to a first guide 14 provided at the front side of the upper frame 6, then to a second guide 15 provided at the upper end of the front support rod 5F. At the first guide 14 and the second guide 15, the wire 13A is guided in the downward direction, changed to the lower direction and then further extended to a reel drum 16 (see FIG. 5), which is provided at the lower end of the front support rod 5F, where the wire 13A is reeled.

Then, out of the pair of lifting wires 13A and 13B for suspending and supporting the platform 4, the lifting wire 13B connected to the rear side of the platform 4 is extended in the upward direction from the platform 4 first to the third guide 17, which is provided at the rear side of the upper frame 6. At the third guide 17, the wire 13B is guided to the front side of the upper frame 6, then into the downward direction via a fourth guide 18 at the upper portion of the front support rod 5F, and then reeled in on the reel drum 16.

The reel drum 16 is driven to be reversely rotated with the aid of electric motor 16A, so that the platform 4 moves up and down by reeling and unreeling the lifting wires 13A and 13B to and from the drum 16.

As shown in FIGS. 3, 4 and 16, wheels 19 for restricting the lateral position of the platform are urged against both the side surfaces of the front support rod 5F and are provided at the front end of the platform 4, and wheels 20 for restricting the front and rear position of the platform are urged against the rear surface of the front support rod 5F and are provided on the front end of the platform 4.

Further, wheels 21 for restricting the lateral position of the platform are urged against both the side surfaces of the rear support rod 5R and are disposed at the rear end of the platform 4 and wheels 22 for restricting the front and rear position of the platform are urged against the front surface of the rear support rod 5R and are provided on the rear side end of the platform 4.

Therefore, the platform 4 is lifted up and down along the front and rear support rods 5F and 5R guided by the front and rear support rods 5F and 5R, while the position of the platform 4 is restricted in the vertical direction of the body and in the front and rear direction of the body.

Figure 14:
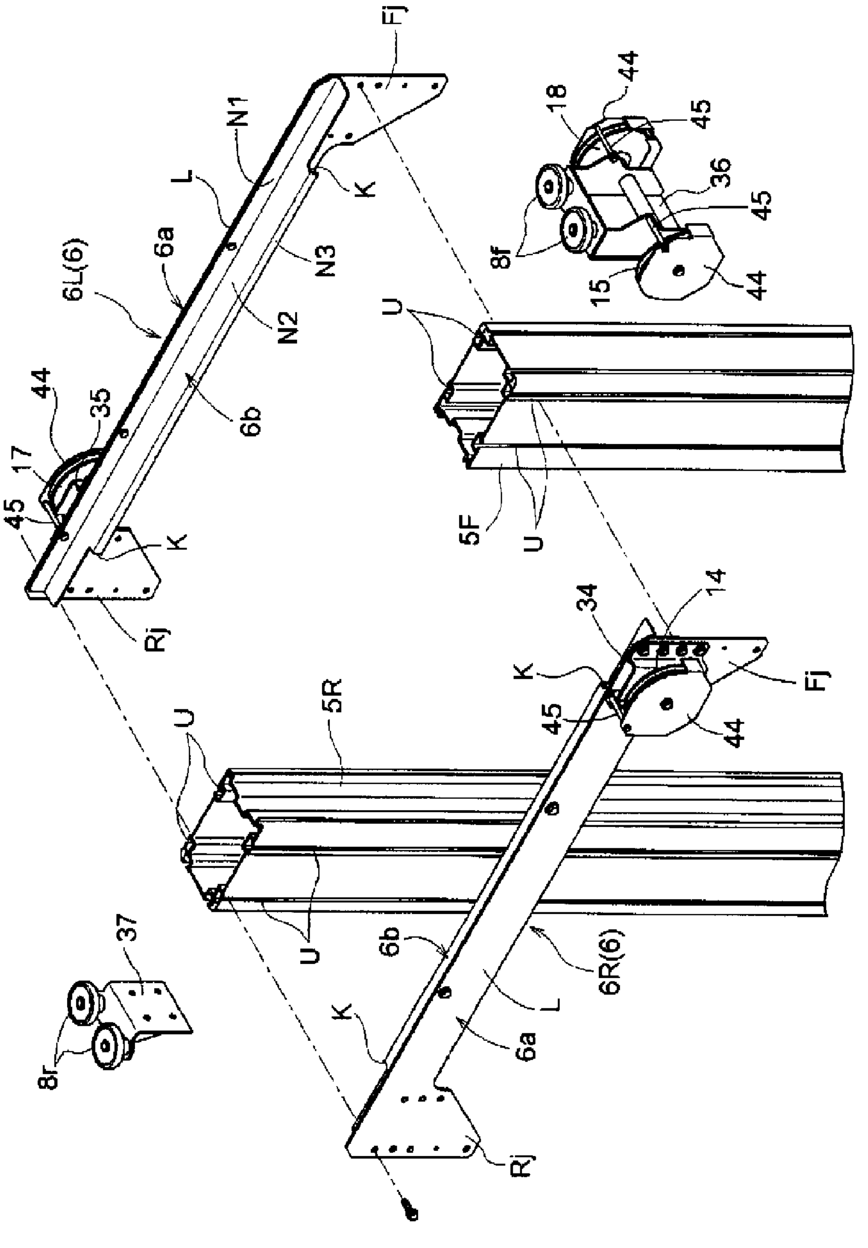
FIG. 14 is a fragmentary, exploded perspective view of the upper frame of FIG. 13.

As shown in FIGS. 4 and 14, the front and rear support rods 5F and 5R are formed as in a rectangular axial shape, i.e., in a rectangular tube shape. Concave grooves U are formed within the side surfaces of the rods, which are constructed such that the penetralia is wider than the entrance, along the longitudinal direction of the support rods. Other members are connected to the support rods by the concave grooves U as explained below.

That is to say, connecting plates (tap plates) with screw holes are inserted in the concave grooves U, and the support rods 5F and 5R and other members are connected together by means of bolts that are threadable to the connecting plates.

As shown in FIGS. 5 to 8, the lower frame 3 comprises a driving wheel support frame 23 for supporting the driving wheel 9, a driving wheel motor 9A for reversely driving the driving wheel 9, an idling wheel support frame 24 for supporting the idling wheel 11, and a connecting frame 25 traversing between the driving wheel support frame 23 and the idling wheel support frame 24. The guide wheels 10 are supported in the driving wheel support frame 23 and the guide wheels 12 are supported in the idling wheel supporting frame 24.

It is noted that, in the present exemplary embodiment, the driving wheel support frame 23 and the idling wheel support frame 24 correspond to the front wheel support frame and the rear wheel support frame, respectively.

Figure 8:
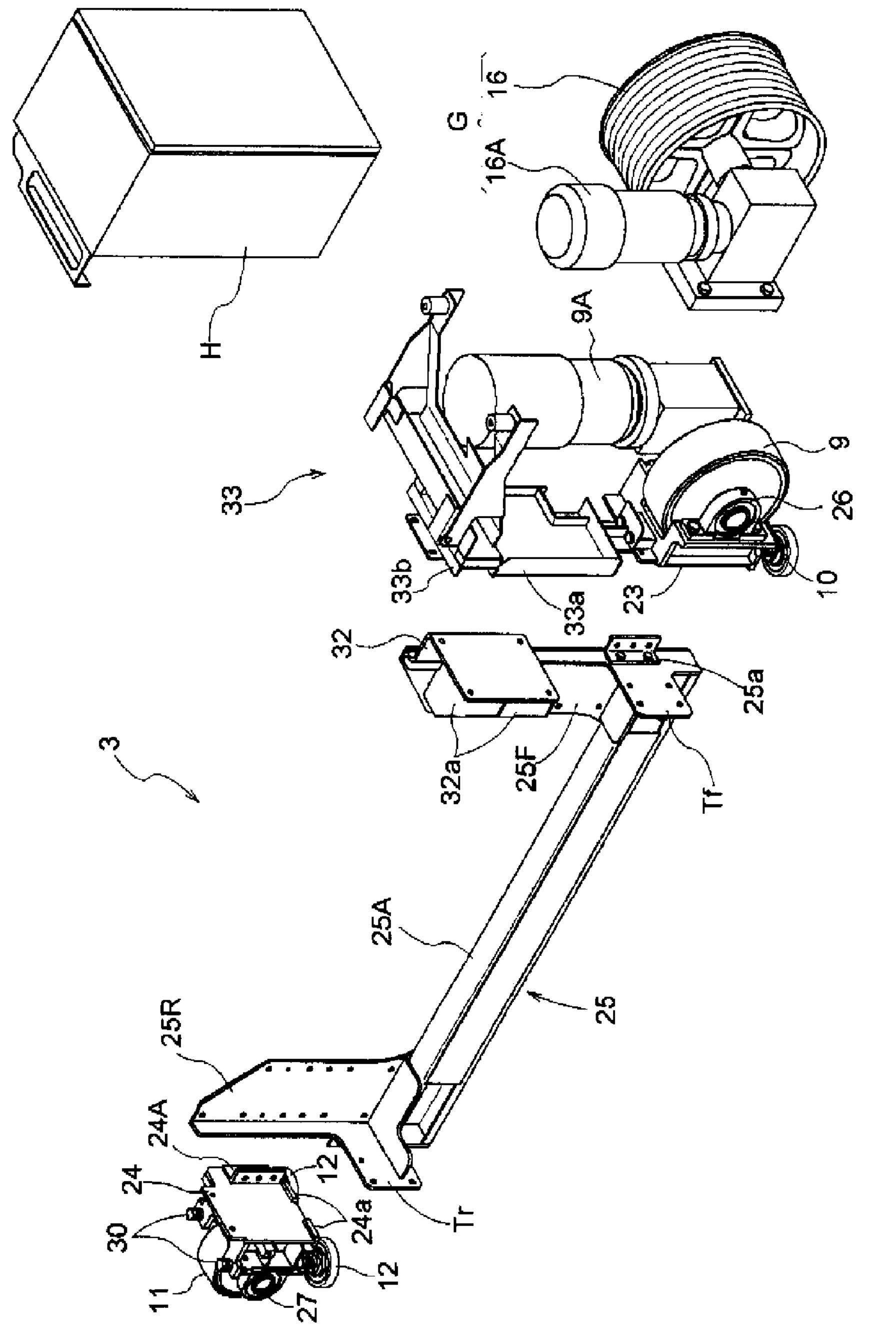
FIG. 8 is an exploded perspective view of the lower frame of the stacker crane of FIG. 3.

As illustrated in FIG. 8, the driving wheel support frame 23 has an inverted C-shape viewed from the top; on the pair of left and right end surfaces on the front side of the frame, a pair of left and right bearing units 26 is fixed with the aid of bolts for rotatably supporting the driving wheel 9.

The driving wheel 9 is installed in the left and right frame portions of the driving wheel support frame 23 such that the rear side portion of the wheel body is set in the frame portions.

Figure 9:
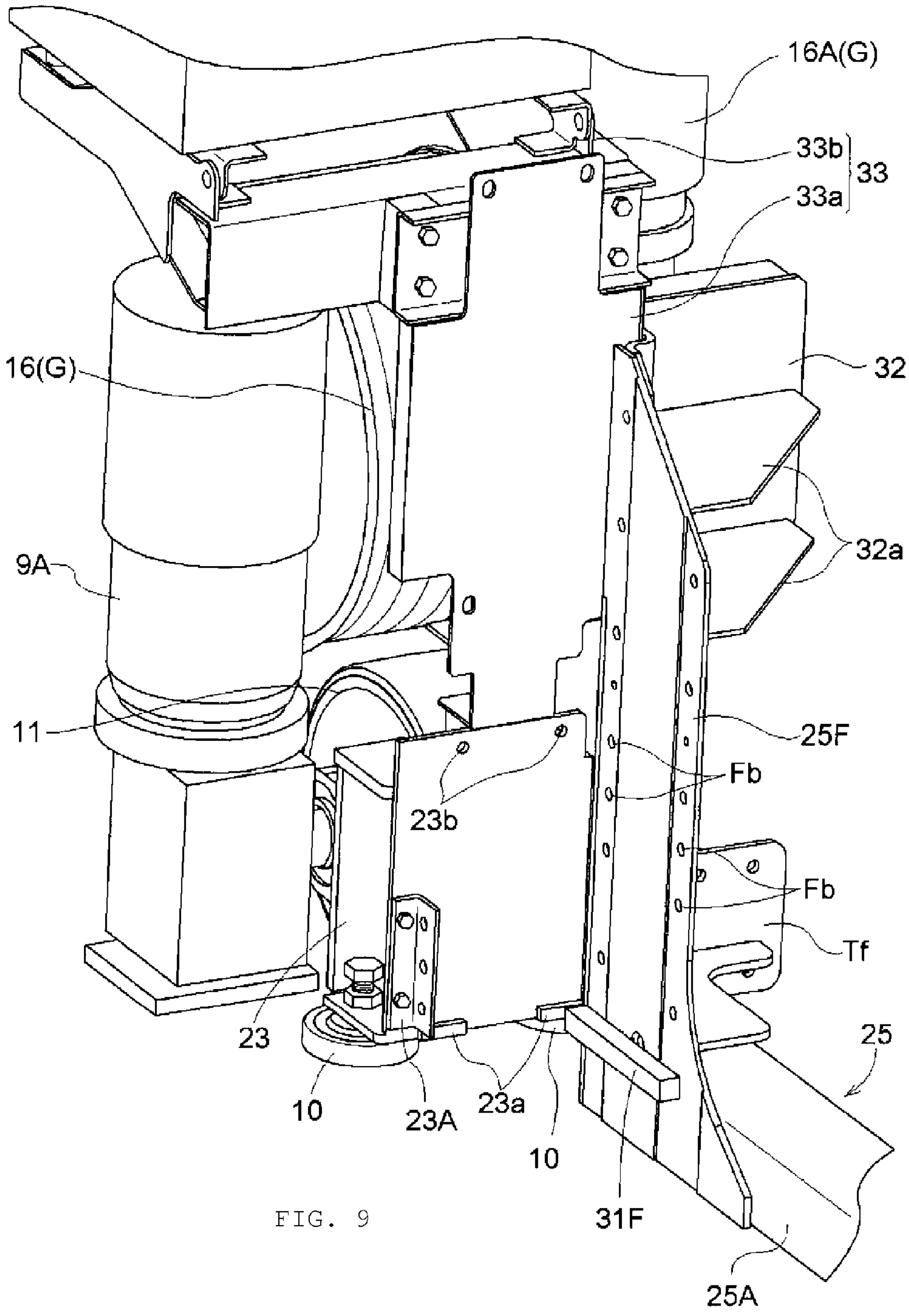
FIG. 9 is a fragmentary, perspective view of an attachment portion of the front support rod in the lower frame of FIG. 5.
Figure 11:
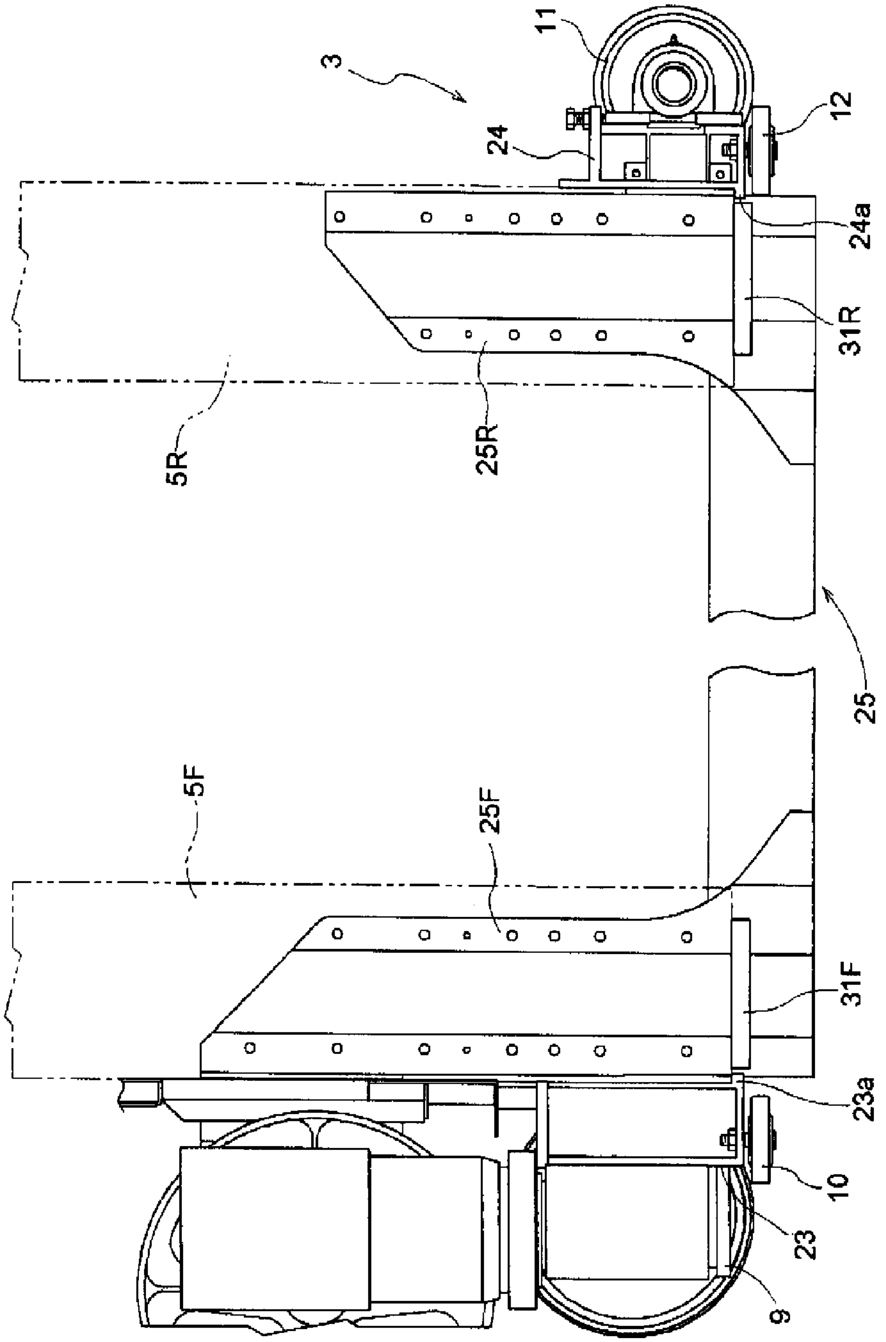
FIG. 11 is a partially hidden and fragmentary, side elevational view of the lower frame of FIG. 5, a part of which is omitted for clarity.

As depicted in FIGS. 9 and 11, a flange **23*a* for mounting the lower end of the front support rod 5F is formed at the lower end of the rear side surface of the driving wheel support frame 23; and the front support rod 5F mounted on the flange 23*a* is connected to the driving wheel support frame 23 by bolts inserted into bolt holes 23*b* formed within the upper end of the driving wheel support frame 23**.

When connecting the front support rod 5F to the driving wheel support frame 23 by bolts, the above-explained connecting plate (tap plate) is inserted into the concave groove U of the front support rod 5F, then the bolts inserted into the holes **23*b*** are threaded to the connecting plate (tap plate).

Figure 6:
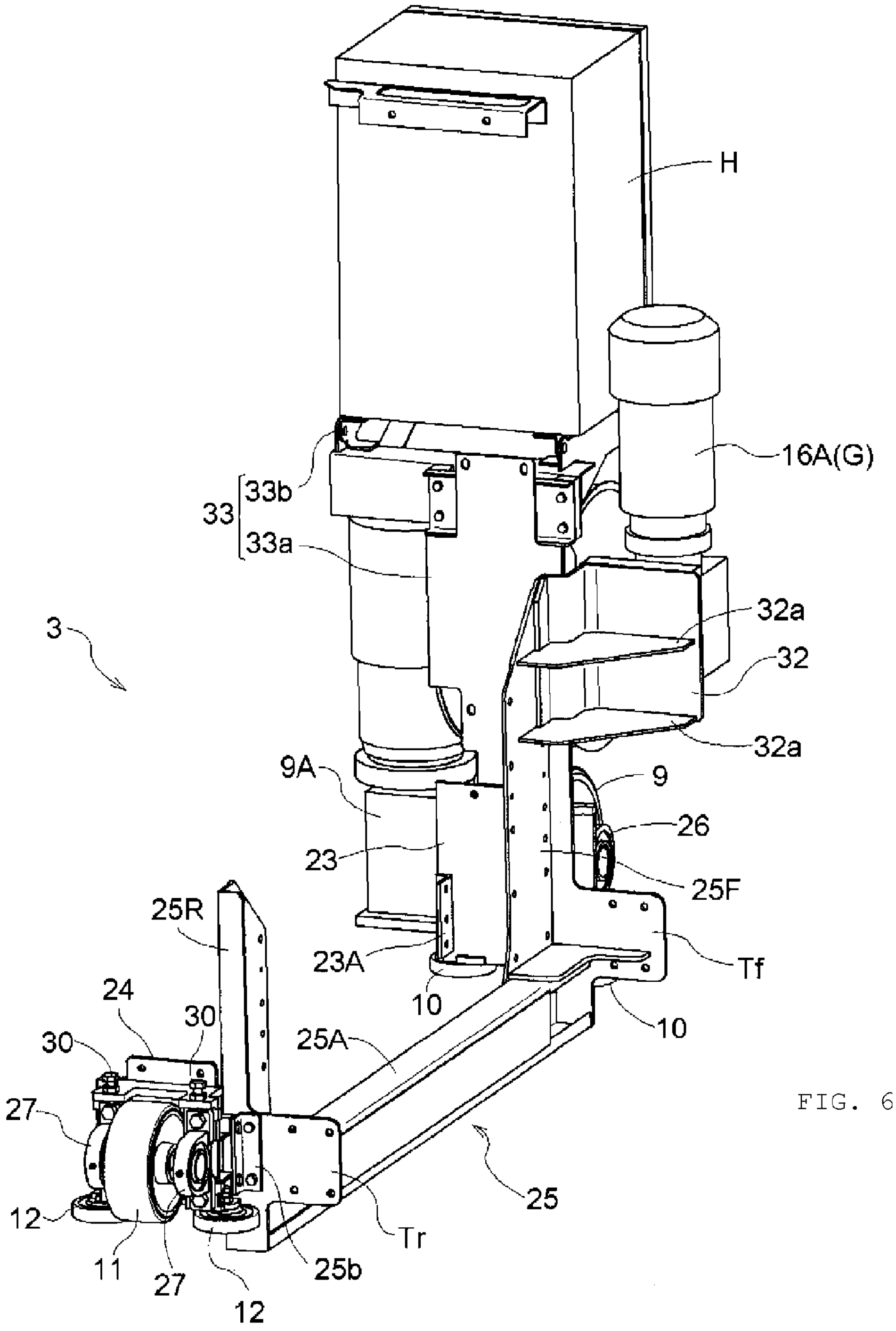
FIG. 6 is a perspective view of the lower frame of the stacker crane of FIG. 3.
Figure 12:
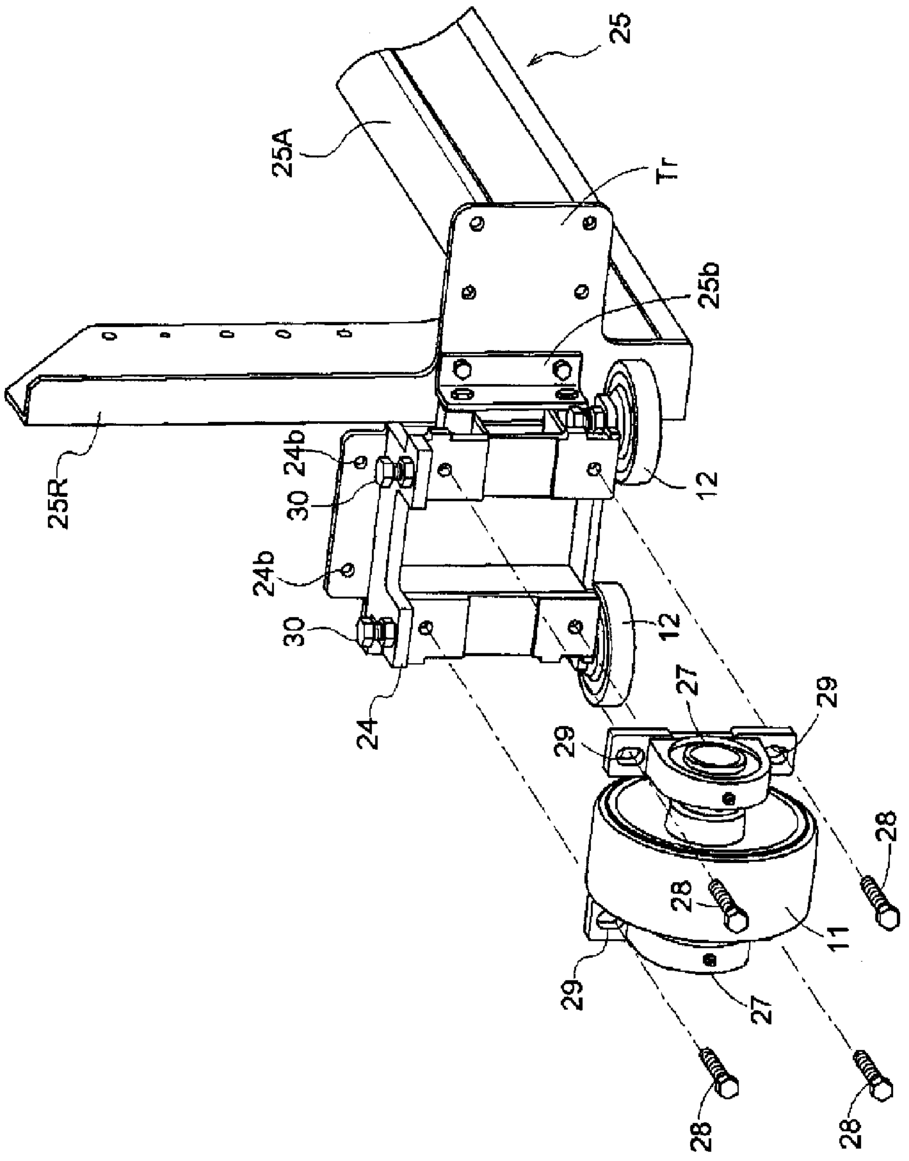
FIG. 12 is a fragmentary, partially exploded perspective view of an attachment of the idling wheel of the lower frame of FIG. 11.

As shown in FIGS. 6 and 12, the idling wheel support frame 24 has a reverse C-shape viewed from the top. A pair of left and right bearing units 27 for rotatably supporting the idling wheel 11 are fixed to a pair of left and right end surfaces of the rear side of the frame 24 by bolts.

It should be noted that the idling wheel 11 is rigged to the idling wheel support frame 24 such that the front side portion of the idling wheel 11 body is set between the left and right frame portions of the idling wheel support frame 24.

Figure 10:
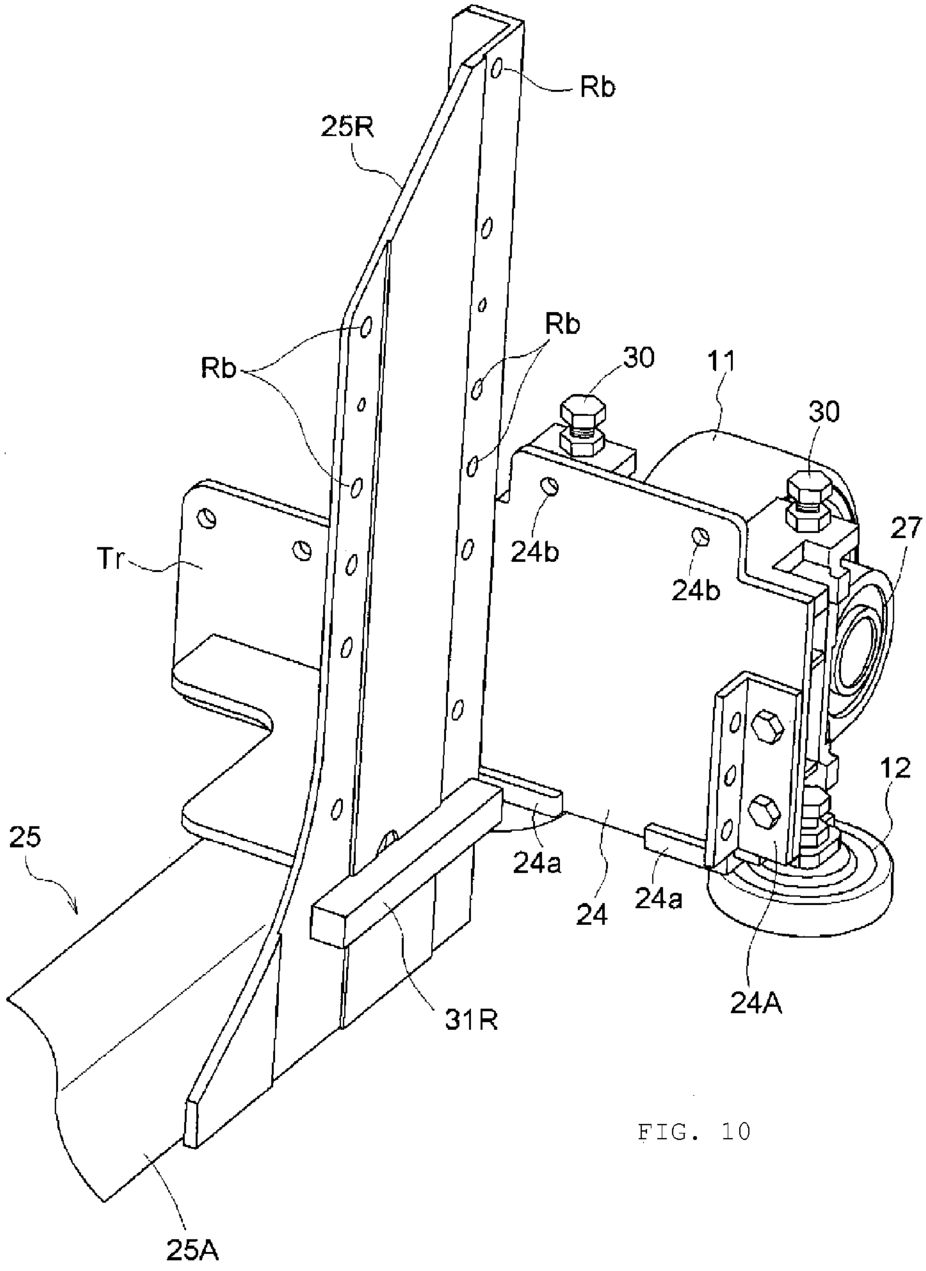
FIG. 10 is a fragmentary, perspective view of an attachment portion of the rear support rod in the lower frame of FIG. 5.

As illustrated in FIGS. 10 and 11, a flange **24*a* for mounting the lower end of the rear support rod 5R is formed at the lower end surface of the front side surface of the idling wheel support frame 24; and the rear support rod 5R mounted on the flange 24*a* is connected to the idling wheel support frame 24 by bolts inserted into bolt holes 24*b* formed at the upper end of the idling wheel support frame 24**.

The bolt connection between the idling wheel support frame 24 and the rear support rod 5R is carried out in the same manner as that in the bolt connection between the driving wheel support frame 23 and the front support rod 5F.

As shown in FIG. 12, the holes 29 within the idling wheel support frame 24, through which bolts 28 are inserted to fix the pair of left and right bearing units 27 of the idling wheel 11 to the idling wheel support frame 24, respectively, are formed as vertically elongated holes, while position limiting bolts 30 by which the vertical movement of the bearing unit 27 of the idling wheel 11 is restricted against the idling wheel support frame 24, are threaded to the idling wheel support frame 24.

Therefore, by adjusting the forward or reverse rotation of the position limiting bolts 30, the vertical position of the bearing unit 27 of the idling wheel 11 with respect to the idling wheel support frame 24 can be adjusted. In accordance with this adjustment, the inclination in the body front and rear direction of the front and rear support rod 5F, 5R, i.e., the inclination of the stacker crane A, can be controlled.

The connecting frame 25 constituting the lower frame 3 is, as shown in FIGS. 5 to 8, provided on one of the sides in the body width direction, i.e. on the right side, of the driving wheel support frame 23 and the idling wheel support frame 24.

The connecting frame 25 comprises an attach portion **25*a* to the side surface of the driving wheel support frame 23 (see FIG. 5) and an attach portion 25*b* to the side surface of the idling wheel support frame 24 at the front and rear end portions of the main frame portion 25A extending in the front and rear directions, respectively (see FIG. 6**).

That is to say, the sub frame portion 25F and 25R having an L-shape section viewed from the top are welded to each of the front-rear edges of the main frame portion 25A so as that they stand from the main frame portion 25A into an upper direction; and to the sub frame portion 25F and 25R, flaps bent to an L-shape constituting the attach portions **25*a*, 25*b* are welded to the sub frame portions 25F and 25**R, respectively.

The main frame portion 25A is configured with the aid of die steel having a C-shaped cross section, inside of which an electric cable, etc. can be housed. In the exemplary embodiment shown in the drawings, a cover is mounted to close the opening at the side of the main frame portion 25A.

Tool attachments Tf and Tr for attaching tools for supporting the lower frame 3 in an suspended manner are integrated to the front sub frame portion 25F and the rear sub frame portion 25R.

That is to say, in an exemplary embodiment, the stacker crane A is transferred from the manufacturing site to the installation site in an exploded condition of lower frame 3, front and rear support rods 5F, 5R, upper frame 6, and platform 4, and is, then, assembled at the installation site. Thus, the lower frame is constructed such that the tools for supporting the lower frame 3 in a suspended manner from the floor surface can be mounted to the lower frame 3.

Figure 7:
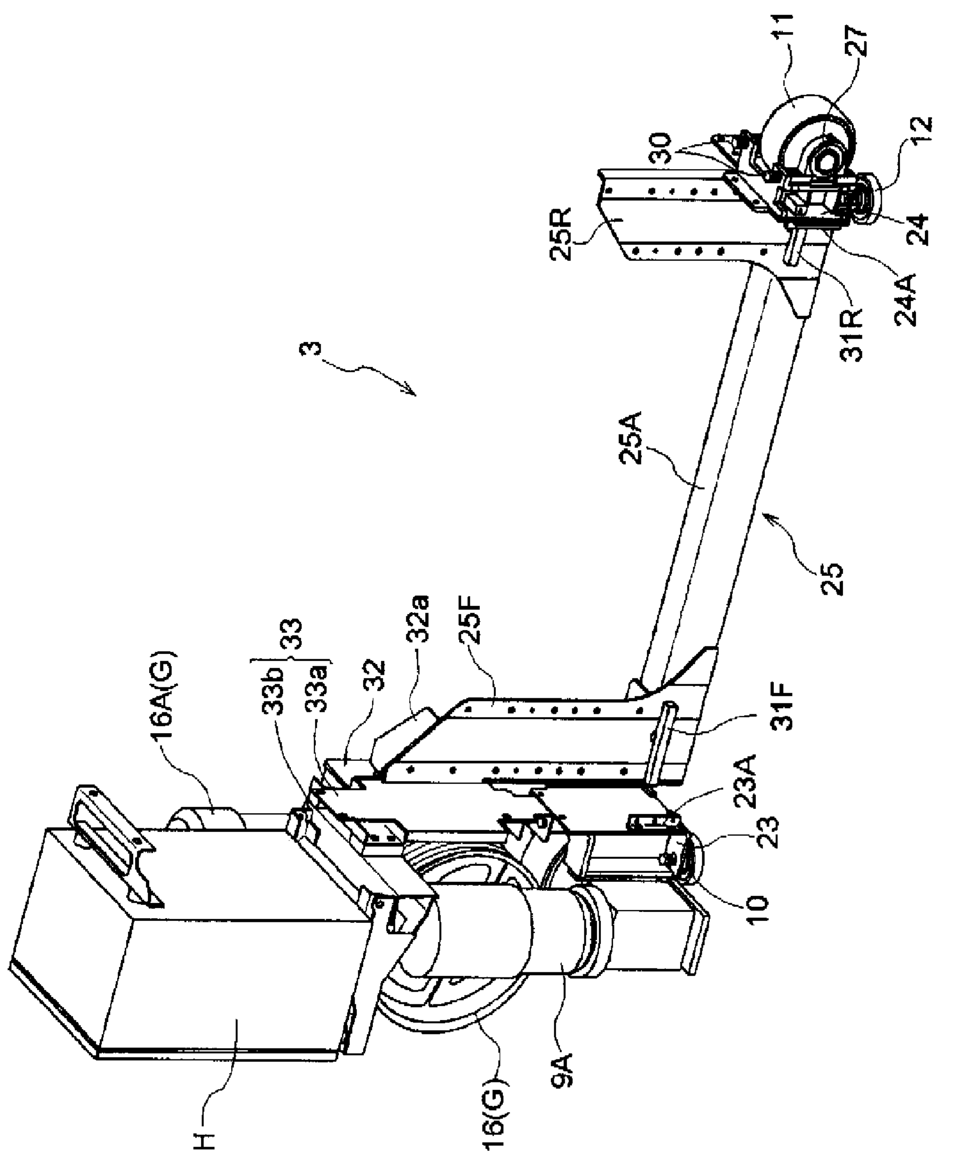
FIG. 7 is a perspective view of the lower frame of the stacker crane of FIG. 3.

As shown in FIGS. 7 and 9, at the lower end portion of the front sub frame 25F and located more to the inner side of the crane body than the main frame 25A, a mount 31F for mounting the right side portion of the lower end surface of the front support rod 5F is provided. The mount 31F is formed by attaching a rectangular axial shaped member for forming the mount to the front sub frame 25F by welding. It is noted that the mount holds the right side portion of the lower end surface of the front support rod 5F, which is different from the front side portion held by the flange **23*a* of the driving wheel support frame 23**.

Further, as shown in FIGS. 7 and 10, at the lower end portion of the rear sub frame 25R and located more to the inner side of at the crane body than the main frame 25A, a mount 31R for mounting the right side portion of the lower end surface of the rear supporting 5R is provided. The mount 31R is also formed by attaching a rectangular axial shaped member for forming the mount to the rear sub-frame 25R by welding. It should be noted that the mount holds the right side portion of the lower end surface of the front support rod 5R, which is different from the front side portion held by the flange **24*a* of the front wheel support frame 24**.

As mentioned with regard to FIG. 9, the bolt insert holes Fb are formed within the portion of the front sub frame 25F, which is positioned more to the inside of the crane than the main frame portion 25A; this portion is connected to the side surface at the crane body inner side surface out of the side surfaces of the front support rod 5F by means of bolts.

That is to say, in this exemplary embodiment, the front sub frame portion 25F is connected to the right surface portion, which is different from the front surface portion being connected and supported by the front side wheel support frame 23 out of the side surfaces of the front support rod 5F, so as to function as a support for the front support rod to be connected to the right side surface.

As mentioned with regard to FIG. 10, the bolt insert holes Rb are formed within the portion of the rear sub frame 25R, which is positioned more to the inside of the crane than the main frame portion 25A; this portion is connected to the side surface at the crane body inner side surface out of the side surfaces of the rear support rod 5R by bolts.

That is to say, in this exemplary embodiment, the rear sub frame portion 25R is connected to the right surface, which is different from the rear surface portion being connected and supported by the rear side wheel support frame 24, out of the side surfaces of the rear support rod 5R, so as to function as a support for the rear support rod.

As seen from FIG. 9, at the left end of the driving wheel support frame 23, the L-shaped connecting plate 23A, which is to be connected to the left side surface of the front support rod 5F, is connected by bolts.

As seen from FIG. 10, at the left end of the idling wheel support frame 24, the L-shaped connecting plate 24A, which is to be connected to the left side surface of the near support rod 5R, is connected by bolts.

Therefore, as shown in FIG. 11, the front support rod 5F, by being connected to the driving wheel support frame 23, the front sub frame 25F and the connecting plate 23A, by bolts under the condition that the lower end of the rod 5F is held and supported at the flange 23*a* of the driving wheel support frame 23 and on the mount 31F for front support rod, is thus supported by the lower frame 3.

Further, as shown in FIG. 11, the rear side support rod 5R is supported at the lower frame 3 by bolt connection with respect to the idling wheel support frame 24, the rear sub frame 25R and the connecting plate 24A under the condition that the lower end of the rod 5R is held and supported on the flange 24*a* of the idling wheel support frame 24 and on the mount 31R for the rear side support rod.

As shown in FIGS. 6 and 8, an attachment frame 32 is welded to the upper end of the front sub frame 25F, to which a device G for driving the platform with a reel drum 16 and an electric motor 16A is attached. Upper and lower reinforcing members 32*a* are provided between the attachment frame 32 and the sub frame 25F.

The device G is attached to the attachment frame 32 by bolts at an upper portion of the driving wheel support frame 23.

As seen from FIGS. 6 to 8, a control box H is mounted above the device G for driving the platform and is supported by a support frame 33. A controller for controlling the operation of the wheel driving motor 9A and/or the operation of the electric motor 16A for driving the reel drum 16 is stored in the control box H.

The support frame 33 for supporting the control box H has a lower frame portion 33*a* extended in a vertical direction and an upper frame portion 33*b*, which is extended backward from the upper end of the lower frame portion 33*a*, so that the control box H is, as shown in FIG. 7, mounted on the upper frame portion 33*b* and supported by the support frame 33 such that, as shown in FIG. 3, the upper end thereof is connected to the front support rod 5F.

Then, the lower end of the lower frame portion 33*a* is bolted to the upper end of the front wheel support frame 23, and, the upper and lower intermediate portion and the upper end of the lower frame portion 33*a* are bolted to the front side support rod 5F. Furthermore, a right side peripheral portion of the lower frame portion 33*a* in the width direction of the body is bolted to the front sub frame 25F.

Figure 13:
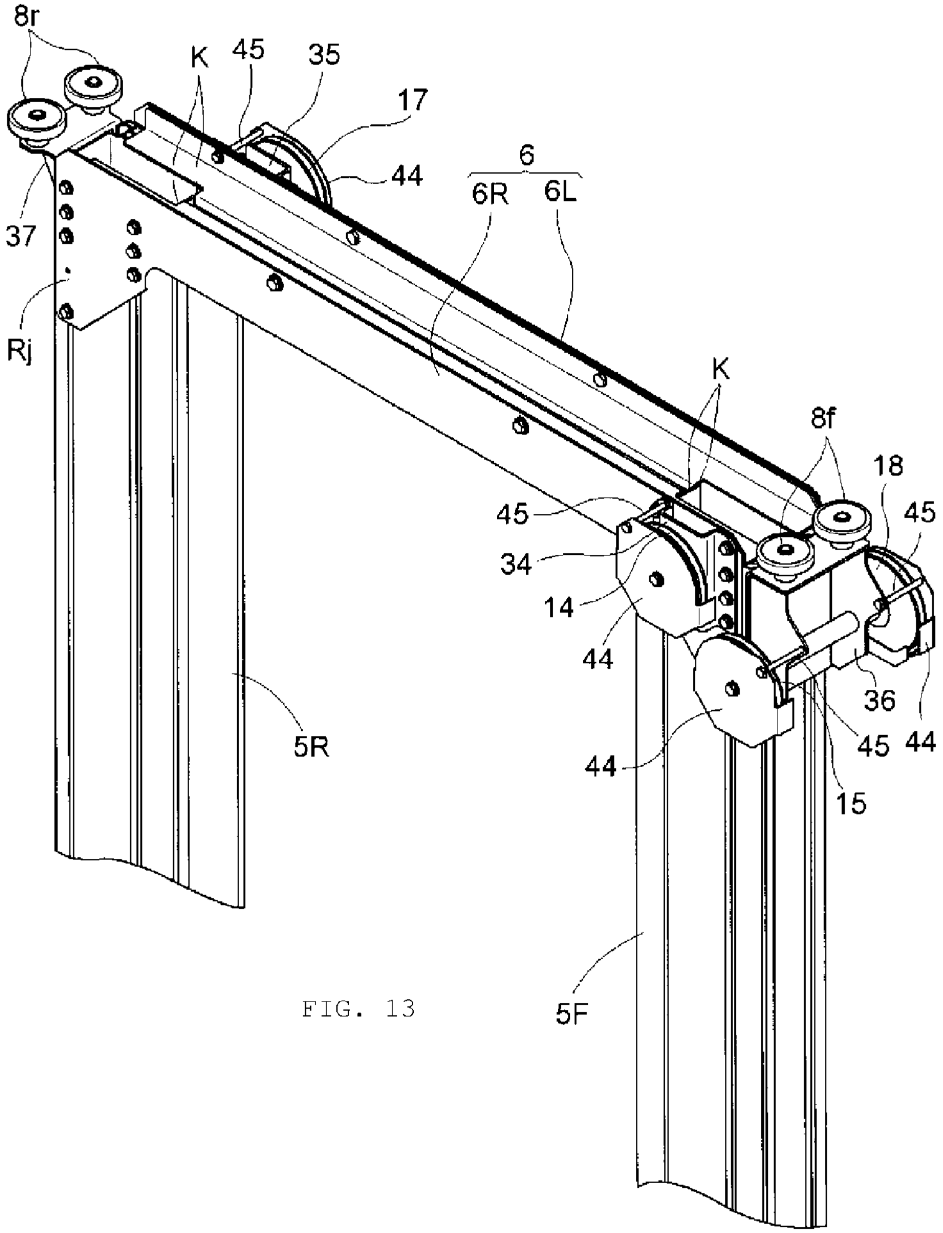
FIG. 13 is a fragmentary, perspective view of the upper frame of the stacker crane of FIG. 3.
Figure 15:
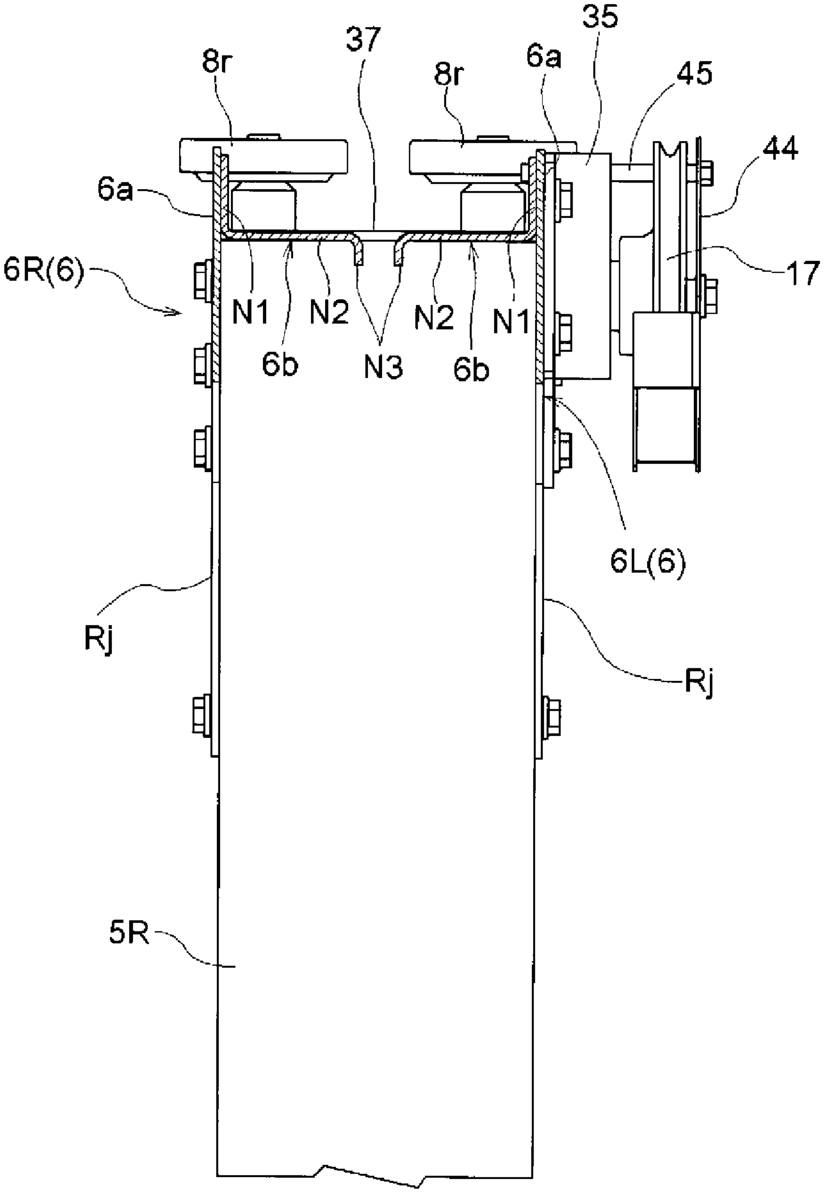
FIG. 15 is a fragmentary, vertical cross sectional view of the upper frame of FIG. 13.

As illustrated in FIGS. 13 to 15, the upper frame 6 of the stacker crane A comprises left and right frame portions 6L and 6R, which are connected to the front and rear support rods 5F and 5R by bolts, respectively, in a condition in which the front and rear support rods 5F and 5R are positioned between the left and right frame portions 6L and 6F. The left and right frame portions 6L and 6R have the same structure, which comprise a main part 6*a* made of a first plate following in a vertical direction and an elongated reinforcing part 6*b*, which is welded to the main part 6*a*. The main part comprises a front and rear extension L extended in the front and rear direction of the crane, and mast connecting portions Fj and Rj which are extended downward from both ends in the front and rear direction of the front and rear extension L.

The left and right frame portions 6L and 6R are connected to the front support rod 5F and the rear support rod 5R by bolts, respectively, in a condition in which the front and rear mast connecting portions Fj and Rj of the main part 6*a* are being urged against the outer side surface of the front support rod 5F and rear support rod 5R, respectively.

When connecting the mast connecting portions Fj, Rj on both ends of the main part 6*a* to the front support rod 5F and the rear support rod 5R, respectively, the above-explained connecting plate is inserted into the concave groove U of the front and rear support rods 5F and 5R, and the bolts are threaded to the connecting plate.

The reinforcing part 6*b* of the left or right frame portions 6L and 6R comprises a second plate following in a horizontal direction as shown in FIG. 15; it projects from the main part 6*a* in a width direction of the crane and elongated in the front and rear direction of the crane. In other words, the reinforcing part 6*b* is bent in two stages with a longitudinal plate portion N1, which is welded to the inside of the main part 6*a* and, following in a vertical direction viewed from the front and rear direction of the crane, a projected portion N2, which is extended inside from the lower end of the longitudinal plate portion N1 in a horizontal direction, and a downward bent portion N3 extended from the end portion of the projected plate portion N2 downwardly. The projected portion N2 corresponds to the plate following in a horizontal direction to project from the main part 6*a* in the width direction of the crane and be extended in the front and rear direction of the crane.

The pair of left and right frame portions 6L and 6R are provided with the reinforcing parts 6*b*, respectively. The reinforcing parts 6*b* project in the width direction of the crane from the main part 6*a* so as to be extended toward the other side frame portion, and the projected portions N2 of the reinforcing parts 6*b* are urged against the upper end of the front and rear support rods 5F and 5R, respectively.

Further, as shown in FIG. 14, the reinforcing parts 6*b* have cutouts at inner side portions in the width direction and at both ends in the front and rear direction thereof. That is to say, both the ends of the downward bent portions N3 of the reinforcing parts 6*b* in the front and rear direction of the crane are located more inside than the end portions of the projected portions N2 of the reinforcing part 6*b* in the front and rear direction of the crane. Therefore, the edges K of the both ends of the downward bent portions N3 in the front and rear direction of the crane are urged to the outer circumference surface of the front and rear support rods 5F and 5R, so that the position of the pair of left and right frame portions 6L and 6R to the front and rear support rods 5F and 5R is restricted in the front and rear direction of the crane.

That is to say, when connecting the mast connecting portions Fj and Rj at the both end portions of the main part 6*a* to the front support rod 5F or the rear support rod 5R by bolts, the projected portion N2 of the reinforcing part 6*b* is urged against the upper end surfaces of the front support rod 5F or the rear support rod 5R. Thereby, the vertical position of the left and right frame portions 6L and 6R with respect to the front support rod 5F or the rear support rod 5R is restricted.

Further, when connecting the mast connecting portions Fj and Rj at the both end portions of the main part 6*a* to the front support rod 5F or the rear support rod 5R by bolts, the front and rear edge portions K of the downward bent portion N3 of the reinforcing part 6*b* are urged against the outer circumference surfaces of the front support rod 5F and the rear support rod 5R. Thereby, the position of the left and right frame portions 6L and 6R with respect to the front support rod 5F or the rear support rod 5R is restricted in the front and rear direction of the body.

In the present exemplary embodiment, the first support 34 for rotatably supporting the first guide 14 is connected to the front support rod 5F by bolts while being urged against the outer surface of the front side mast connecting portion Fj of the right side frame portion 6R of the upper frame 6. The first guide 14 guides the lifting wire 13A, which is connected to the body front side of the platform 4, out of the lifting wires 13A and 13B.

Further, the second support 35 for rotatably supporting the third guide 17 is connected by bolts to the rear support rod 5R while being urged against the outer surface of the rear side mast connecting portion Rj of the left side frame portion 6L of the upper frame 6. The third guide 17 guides the lifting wire 13B, which is connected to the body rear side of the platform 4, out of the lifting wires 13A and 13B.

Furthermore, the second guide 15 for guiding the lifting wire 13A, which has been guided downward by the first guide 14, and the fourth guide 18 for guiding the lifting wire 13B, which has been guided downward by the third guide 17, are commonly supported by the third support 36. The third support 36 is connected to the front surface of the front support rod 5F by bolts.

Moreover, the third support 36 is configured to support the front side left and right guide rollers 8*f*, from amongst of the front and rear guide rollers 8*f* and 8*r*, which are being urged against the guide rail 7 on the ceiling.

The fourth support 37, which is connected to the rear support rod 5R by bolts, is configured to support the rear side left and right guide rollers 8*r*, from amongst of the front and rear side guide rollers 8*f* and 8*r*, which are being urged against the guide rail 7 on the ceiling.

Figure 17:
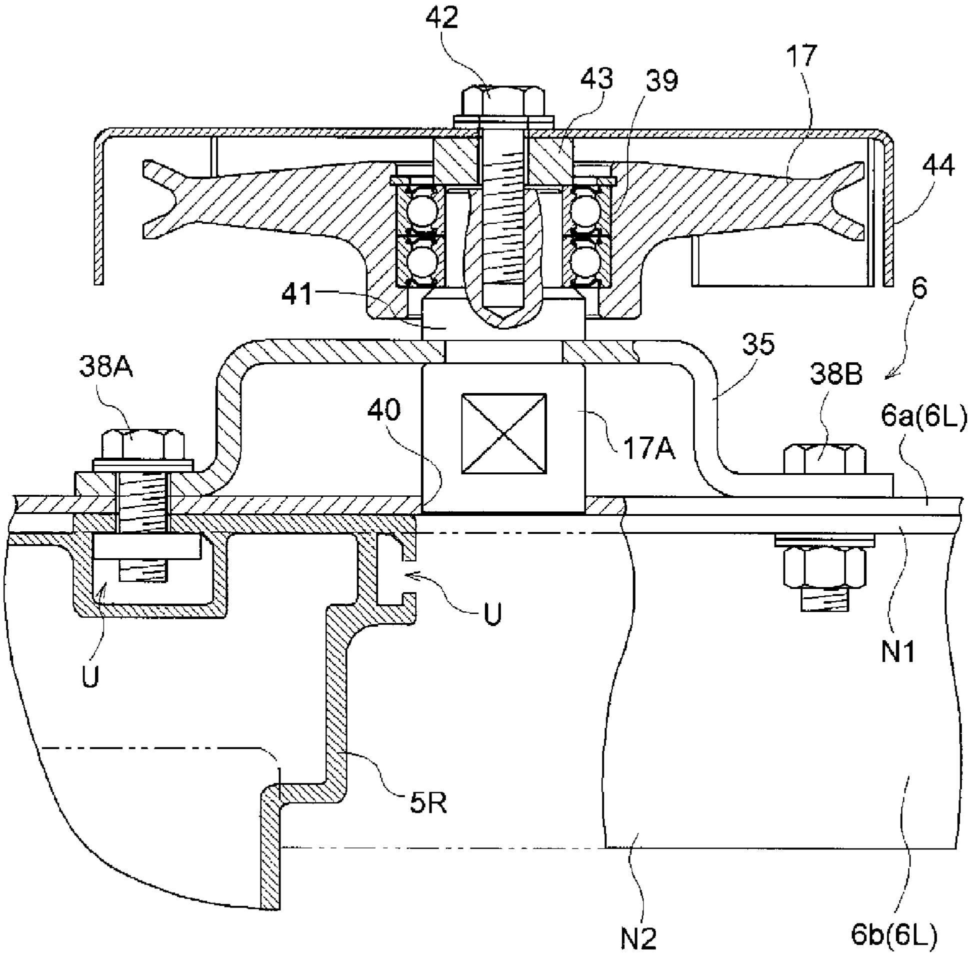
FIG. 17 is a fragmentary, enlarged, partially cross-sectional, side elevational view of a third guide according to the invention.
Figure 18:
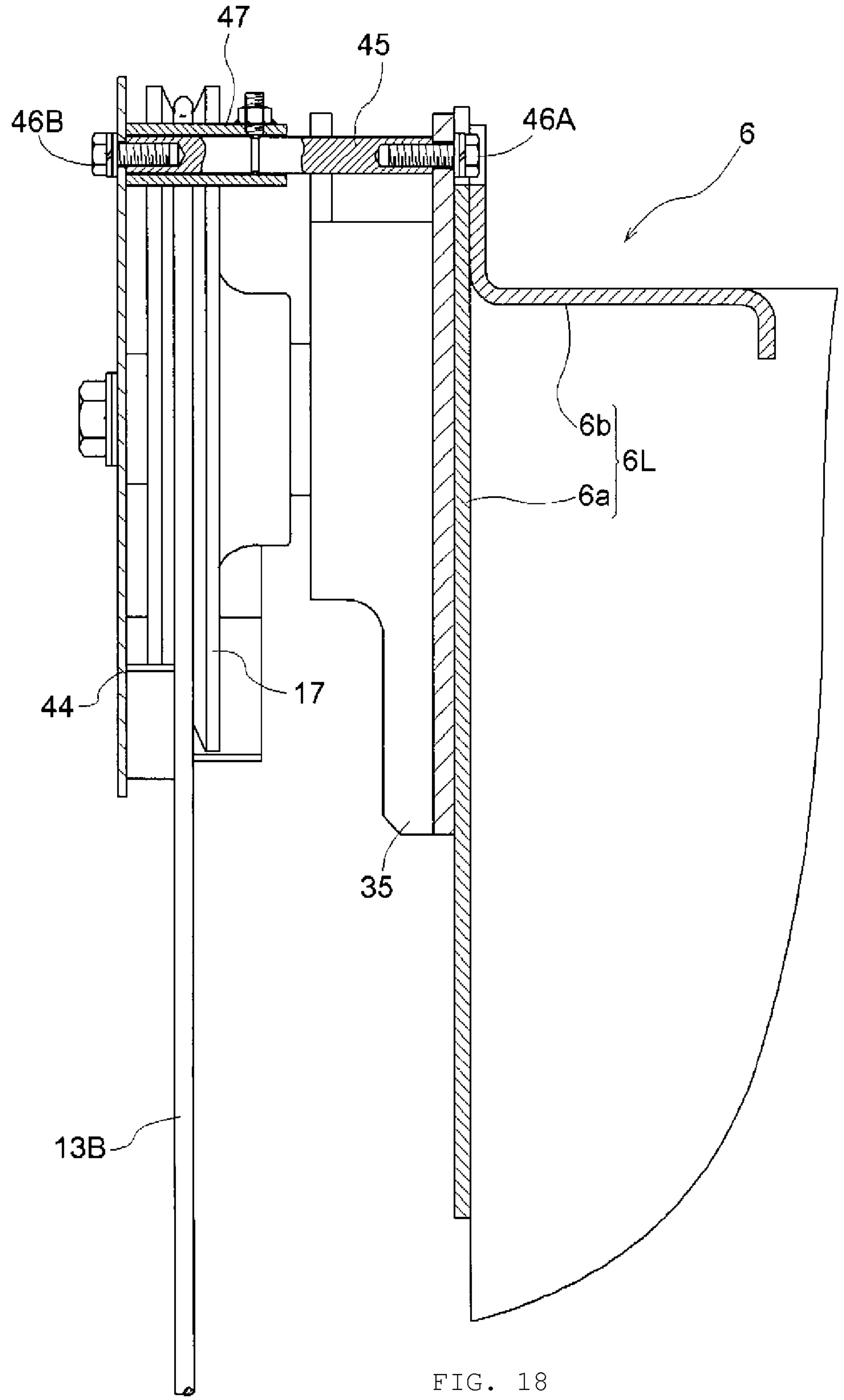
FIG. 18 is a fragmentary, enlarged, rear elevational view of attachment of a third guide according to the invention.

Additional explanation for the support structure of the third guide 17 is made with regard to FIGS. 17 and 18. The second support 35 comprises a main part having a reversed C-shape viewed from the top and plate portions extended from the ends of the main part in the front and rear directions of the crane, respectively.

The plate portion extended in the rear direction of the body from the main part of the second support 35 is connected to the rear support rod 5R by bolt 38A, while holding the main part 6*a* of the left side frame portion 6L of the upper frame 6 between the rear support rod 5R and the plate portion, and the plate portion extended in the front direction of the body from the main part of the second support 35 is connected to the left side frame portion 6L of the upper frame 6 by a bolt 38B, which penetrates through the main part 6*a* of the left frame portion 6L of the upper frame 6 and the longitudinal plate portion N1 of the reinforcing part 6*b*.

The support rod 17A for supporting the third guide 17 is configured to rotatably support the third guide 17 via the bearing 39. The support rod 17A is provided in a condition in which the intermediate portion in a longitudinal direction of the rod 17A is inserted into the second support 35 and the base portion of the rod 17A is engaged into the engagement hole 40 formed in the main part 6*a* of the left frame portion 6L of the upper frame 6.

The second support 35 and the bearing 39 are intermediated by a spacer 41 so that a bolt 42 threaded to the top portion of the support rod 17A urges the bearing 39 toward the second support 35 via a ring-shaped press member 43.

It is noted that the first guide 14 is supported by the same structure as that of the third guide 17 and, therefore, the explanation thereof is omitted here.

Further, a cover 44 for the side surface of the third guide 17 is tightened by bolt 42, which is threaded to the top portion of the support rod 17A. The cover 44 is provided for all the first to fourth guides 14 to 18, respectively, as shown in FIGS. 13 and 14.

As illustrated in FIGS. 14, 15 and 18, the peripheral portions of the covers 44 for the first to fourth guides 14 to 18 are supported by supporting rods 45, respectively.

As a representative of the mounting portions of the supporting rods for these guides, the mounting portion of the supporting rod 45 for the third guide 17 will be explained with reference to FIG. 18. The inside portion of the supporting rod 45 in the width direction of the crane is supported by the second support 35 in a condition where the inside portion is connected to the second support 35 by a bolt 46A, which penetrates through the second support 35, and to the outside portion of the supporting rod 45 in the width direction of the body is threaded a bolt 46B, which penetrates through the cover 44, so that the peripheral portion of the cover 44 is supported by the support rod 45.

The supports rods 45 for supporting the peripheral portions of the covers 44 for the first to fourth guides 14 to 18 are used as supports for stoppers 47 (see FIG. 18) for preventing a situation in which hoisting wires 13A and 13B come off from the first to fourth guides 14 to 18, respectively.

Figure 19:
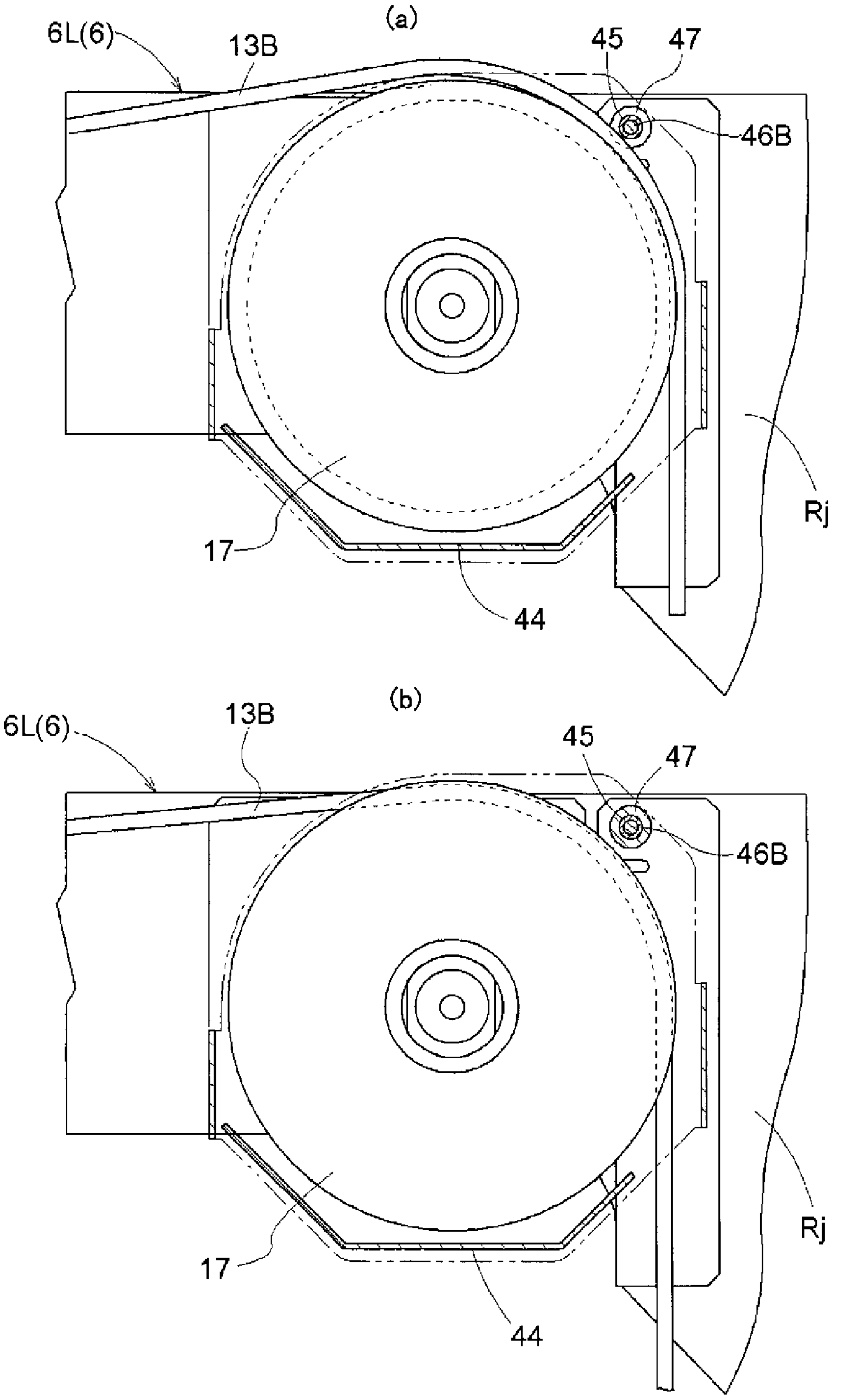
FIG. 19*a* is a fragmentary, enlarged, side elevational view of the third guide of FIG. 18 with the stopper in a releasing position.
FIG. 19*b* is a fragmentary, enlarged, side elevational view of the third guide of FIG. 18 with the stopper in a stopping position.
Figure 20:
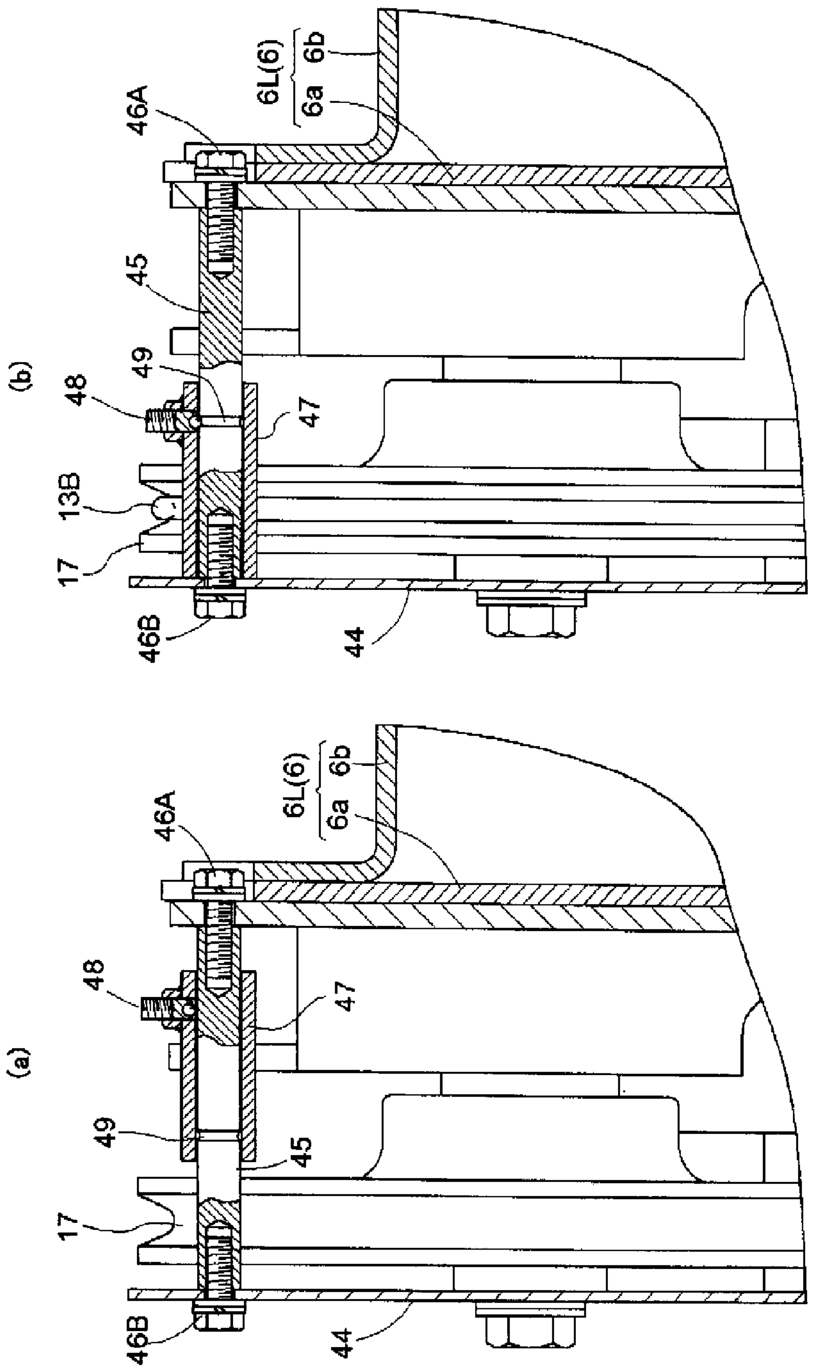
FIG. 20*a* is a fragmentary, enlarged, rear elevational view of the third guide of FIG. 18 with the stopper in a releasing position.
FIG. 20*b* is a fragmentary, enlarged, rear elevational view of the third guide of FIG. 18 with the stopper in a stopping position.

Referring to FIGS. 18 to 20, the following is an explanation for the support rod 45 of the cover 44 for the third guide 17, representing the support rods 45 for the first to fourth guides 14 to 18. The stopper 47 has a cylindrical shape and is slidably set on the support rod 45. That is to say, the stopper 47 is slid along the support rod 45 in a longitudinal direction, so that the position thereof can be switched between the stopping position, at which it is positioned to be opposite to the third guide 17 in order to restrict the coming out of the wire 13B from the third guide 17 as shown in FIGS. 18, 19(*b*) and 20(*b*), and the releasing position, at which it is positioned to be away from the third guide 17 in order to release the stop of the wire 13B as shown in FIGS. 19(*a*) and 20(*a*).

Furthermore, the stopper 47 is provided with a positioning screw 48, which is threadably moved along the radius direction of the stopper, while the supporting rod 45 is provided with a ring-shaped groove 49 into which the top end of the screw 48 is engageable when the stopper 47 is positioned at the stopping position.

Therefore, when attaching the wire 13B, a large space is formed between the third guide 17 and the supporting rod 45 therethrough by switching the stopper 47 to the releasing position for inserting the wire 13B. After attaching the wire 13B, the stopper 47 is switched to the stopping position and the positioning screw 48 is engaged into the ring-shaped groove 49, so that any separation of the wire 13B from the third guide 17 can be prevented.

In the exemplary embodiments mentioned above, the upper frame has a pair of left and right frame portions; however, the stacker crane can be embodied with the upper frame only having one frame portion.

In the case of the stacker crane having a pair of left and right frame portions, the left and right frame portions are not connected to each other in the above-mentioned embodiments. However, a configuration where a plurality of connecting frames for connecting the left and right frame portions are provided in the body front and rear direction in a condition that both end portions of the connecting frames are connected to the left and right frame portions by bolts, respectively, makes possible the forming of a ladder-shaped upper frame.

In the exemplary embodiments mentioned above, the enforce part constituting the upper frame has a projected portion and a downward bent portion, however, the downward bent portion can be omitted.

In such a case where no downward bent portion is provided, the upper end portion of the plate of the main part extended in a vertical direction could be bent in the width direction of the body in order to use the bent portion as an enforcing part.

In the exemplary embodiments mentioned above, the lower end surfaces of the front and rear support rods are mounted not only on the driving wheel support frame or the flange of the idling wheel support frame but also on the mount for the rods provided on the lower frame. However, the mount for the rods can be omitted.

In the exemplary embodiments mentioned above, a driving wheel and an idling wheel are provided as running wheels. However, it is possible to provide driving wheels on both the front and rear of the lower frame.

In the exemplary embodiments mentioned above, the connecting frame is disposed on the side surface of the front and rear wheel support frames. However, it may be possible to arrange connecting frames both at the left and right side surfaces of the front and rear wheel supporting frames, respectively, or the connecting frame could be disposed at left and right center positions of the front and rear wheel support frames.

LIST OF NUMERICAL REFERENCES

2 rail
3 lower frame
4 platform
5F, 5R support rod
6 upper frame
6*a* main part
6*b* reinforcing part
6L, 6R frame portion
9 running wheel (driving wheel)
11 running wheel (idling wheel)
23, 24 wheel support frame
23*a* flange
24*a* flange
25 connecting frame
Fj, Rj mast connecting portion
K edge portion
L front and rear extensions
N2 projected portion
N3 downward bent portion The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A stacker crane, comprising:
a lower frame having:
front and rear end portions; and
running wheels operable to run freely along at least one rail, the running wheels disposed at both of the front and rear end portions;
front and rear support rods standing respectively from the front and rear end portions of the lower frame, the front and rear support rods each having an upper end portion, a horizontal top end, and a side surface;
an upper frame connected to the upper end portions of the front and rear support rods;
a platform guided by the front and rear support rods and operable to be freely lifted up and down, the platform, the lower frame, the front and rear support rods, and the upper frame together defining:
a crane rear direction;
a crane front direction;
a crane vertical direction;
a crane downward direction; and
a crane width direction; and
the upper frame comprising:
a main part formed by a first plate extending in the crane vertical direction and comprising:
front and rear extensions extending respectively in the front crane and rear crane directions, the front and rear extensions each having extension ends; and
front and rear mast connecting portions extending in the crane downward direction respectively from the extension ends of the front and rear extensions, the front and rear mast connecting portions being connected respectively to the front and rear support rods by bolts and being urged against the respective side surfaces of the front and rear support rods;
a reinforcing part formed by a second plate extending horizontally in the crane width direction and extending in the front and rear crane directions;
a pair of left and right frame portions comprising the main part and the reinforcing part of the upper frame;
the pair of left and right frame portions are directly connected respectively to the front and rear support rods to position the front and rear support rods between the left and right frame portions; and
each reinforcing part of the pair of left and right frame portions comprises a projected portion projecting in the crane width direction from the main part to extend toward a respective other one of the left and right frame portions and to be directly urged against the horizontal top ends of both of the front and rear support rods.

2. The stacker crane according to claim 1, wherein:
the front and rear support rods have outer circumference surfaces;
each reinforcing part further comprises a downward bent portion extending in the crane downward direction from an end portion of the projected portion projecting in the crane width direction, each downward bent portion having an end portion;
each end portion of the downward bent portion extends more inside than the end portion of the projected portion in the front and rear crane directions; and
edge portions at the end portions of the downward bent portions in the front and rear crane directions are urged against the outer circumference surfaces of the front and rear support rods to restrict a position of the pair of left and right frame portions against the front and rear support rods in the front and rear crane directions.

3. The stacker crane according to claim 2, wherein:

each of the front and rear support rods has a lower end surface;

the lower frame comprises:

front and rear wheel support frames operable to support the running wheels, each of the front and rear wheel support frames has a lower end portion; and a connecting frame connecting the front and rear wheel support frames to each other;

the lower end portion of the front wheel support frame has a first mount portion operable to hold and mount the lower end surface of the front support rod, the lower end surface of the front support rod being held on the first mount portion and the side surface thereof being connected to and supported by the front wheel support frame; and the lower end portion of the rear wheel support frame has a second mount portion operable to hold and mount the lower end surface of the rear support rod, the lower end surface of the rear support rod being held on the second mount portion and the side surface thereof being connected to and supported by the rear wheel support frame.

4. The stacker crane according to claim 1, wherein:

each of the front and rear support rods has a lower end surface;

the lower frame comprises:

front and rear wheel support frames operable to support the running wheels, each of the front and rear wheel support frames has a lower end portion; and a connecting frame connecting the front and rear wheel support frames to each other;

the lower end portion of the front wheel support frame has a first mount portion operable to hold and mount the lower end surface of the front support rod, the lower end surface of the front support rod being held on the first mount portion and the side surface thereof being connected to and supported by the front wheel support frame; and the lower end portion of the rear wheel support frame has a second mount portion operable to hold and mount the lower end surface of the rear support rod, the lower end surface of the rear support rod being held on the second mount portion and the side surface thereof being connected to and supported by the rear wheel support frame.

5. The stacker crane according to claim 1, wherein the platform, the lower frame, the front and rear support rods, and the upper frame together define a ceiling side, and further comprising guide rollers operable to be urged against side surfaces of the guide rail and attached respectively to the front and rear support rods at the ceiling side.

* * * * *